United States Patent
Yamamoto et al.

(10) Patent No.: US 9,705,375 B2
(45) Date of Patent: Jul. 11, 2017

(54) MOLDED MOTOR WITH INSULATION INNER WALL AND AIR CONDITIONER

(71) Applicant: Mitsubishi Electric Corporation, Tokyo (JP)

(72) Inventors: Mineo Yamamoto, Tokyo (JP); Mamoru Kawakubo, Tokyo (JP); Hiroyuki Ishii, Tokyo (JP); Hiroki Aso, Tokyo (JP); Junichiro Oya, Tokyo (JP); Yuto Urabe, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 90 days.

(21) Appl. No.: 14/433,405

(22) PCT Filed: Sep. 2, 2013

(86) PCT No.: PCT/JP2013/073562
§ 371 (c)(1),
(2) Date: Apr. 3, 2015

(87) PCT Pub. No.: WO2014/061359
PCT Pub. Date: Apr. 24, 2014

(65) Prior Publication Data
US 2015/0263581 A1    Sep. 17, 2015

(30) Foreign Application Priority Data
Oct. 15, 2012  (JP) ................................. 2012-228317

(51) Int. Cl.
*H02K 5/02* (2006.01)
*H02K 29/08* (2006.01)
(Continued)

(52) U.S. Cl.
CPC ............... *H02K 5/02* (2013.01); *F04D 13/06* (2013.01); *H02K 3/522* (2013.01); *H02K 5/08* (2013.01);
(Continued)

(58) Field of Classification Search
CPC ........ H02K 29/08; H02K 3/522; H02K 5/225; H02K 15/12; H02K 5/08; H02K 5/02; F04D 13/06
(Continued)

(56) References Cited

U.S. PATENT DOCUMENTS 4,015,154 A * 3/1977 Tanaka ................... H02K 15/00
264/272.2
4,495,450 A    1/1985 Tokizaki et al.
(Continued)

FOREIGN PATENT DOCUMENTS

EP    2667491 A1    11/2013
JP    S60-32534 A    2/1985
(Continued)

OTHER PUBLICATIONS

JPO machine translation of JP 2010028909 A, Yamamoto et al.; Molded stator, pump, water heater, electrci motor and method of manufacturing pumps; All pages.*
(Continued)

*Primary Examiner* — Naishadh Desai
(74) *Attorney, Agent, or Firm* — Posz Law Group, PLC

(57) ABSTRACT

A molded motor made by molding, with a thermosetting resin, a stator, which includes: a stator core formed by stacking magnetic steel plates; an insulation portion applied to the stator core; a winding applied to the insulation portion; and a power supply terminal. On an insulation inner wall provided on an inner diameter side of the insulation portion, a plurality of inner wall protrusions formed at axial ends of
(Continued)

the insulation inner wall on a counter wire-connection side of the stator core and abutting on a die, used when the stator is molded, are provided in a circumferential direction of the stator core.

6 Claims, 20 Drawing Sheets

(51) Int. Cl.
    *H02K 3/52*     (2006.01)
    *H02K 5/22*     (2006.01)
    *H02K 15/12*     (2006.01)
    *F04D 13/06*     (2006.01)
    *H02K 5/08*     (2006.01)

(52) U.S. Cl.
    CPC ............ *H02K 5/225* (2013.01); *H02K 15/12* (2013.01); *H02K 29/08* (2013.01); *H02K 2203/03* (2013.01); *H02K 2203/12* (2013.01); *H02K 2211/03* (2013.01)

(58) Field of Classification Search
    USPC ............................................... 310/43, 216.01
    See application file for complete search history.

(56) References Cited

U.S. PATENT DOCUMENTS

| 8,466,594 | B1* | 6/2013 | Lin ........................ | H02K 3/522 |
| | | | | 310/214 |
| 2013/0293036 | A1* | 11/2013 | Yamamoto ............. | H02K 1/276 |
| | | | | 310/43 |

FOREIGN PATENT DOCUMENTS

| JP | H07-107724 | A | | 4/1995 |
| JP | H11-275793 | A | | 10/1999 |
| JP | 2001-178062 | A | | 6/2001 |
| JP | 2001-268835 | A | | 9/2001 |
| JP | 2001-268862 | A | | 9/2001 |
| JP | 2003-244880 | A | | 8/2003 |
| JP | 2004-096838 | A | | 3/2004 |
| JP | 2007-185038 | A | | 7/2007 |
| JP | 4351929 | B2 | | 7/2009 |
| JP | 2010-011669 | A | | 1/2010 |
| JP | 2010-028909 | A | | 2/2010 |
| JP | 2010028909 | A | * | 2/2010 |
| JP | 2010-142075 | A | | 6/2010 |
| JP | 2010-273517 | A | | 12/2010 |
| JP | 2011-244627 | A | | 12/2011 |
| JP | 2012-120261 | A | | 6/2012 |

OTHER PUBLICATIONS

International Search Report of the International Searching Authority mailed Dec. 3, 2013 for the corresponding international application No. PCT/JP2013/073562 (and English translation).

Extended European Search Report mailed May 30, 2016 for the corresponding EP application No. 13846624.8.

Office Action dated Aug. 3, 2016 issued in corresponding CN patent application No. 201380053452.X (and partial English translation).

Office Action mailed Mar. 3, 2017 issued in the corresponding CN patent application No. 201380053452.X (and partial English translation).

* cited by examiner

MOLDED MOTOR WITH INSULATION INNER WALL AND AIR CONDITIONER

CROSS REFERENCE TO RELATED APPLICATION

This application is a U.S. national stage application of International Patent Application No. PCT/JP2013/073562 filed on Sep. 2, 2013, and claims priority to, and incorporates by reference, Japanese Patent Application No. 2012-228317 filed Oct. 15, 2012.

TECHNICAL FIELD

The present invention relates to a molded motor and an air conditioner.

BACKGROUND

A conventional molded motor is configured so that a stator core and a winding are covered with a mold resin such as BMC (Bulk Molding Compound) by injecting the mold resin into a molding die that accommodates therein the stator core. For example, in a conventional technique described in Patent Literature 1 described below, a regulating member is formed in a molding die, and the regulating member engages with an outer peripheral lower side of a stator core so that the lateral motion thereof cannot be made, thereby regulating lateral movements of the stator core in an accommodating concave portion of the molding die. With this configuration, a gap between a periphery of a rotor insertion hole of the stator core and a central die portion of the molding die is maintained in a uniform size; a thin resin mold layer is formed with a uniform thickness on the periphery of the rotor insertion hole; and thus misalignment of a bearing is reduced, thereby improving the rotation efficiency of a molded motor.

PATENT LITERATURE

Patent Literature 1: Japanese Patent No. 4351929

However, in the conventional technique described in Patent Literature 1 described above, when a stator is molded, a boundary surface is formed between a stator core (or an insulation portion of a stator core) supported by the regulating member and the mold resin; and the boundary surface protrudes on an outer periphery of the molded stator. Therefore, there is a problem that, as the boundary surface becomes a penetration path of water into the molded stator, quality degradation may be caused.

SUMMARY

The present invention has been achieved in view of the above problem, and an objective of the present invention is to provide a molded motor and an air conditioner that can achieve further improvement in quality.

In order to solve the problem and achieve the objective, the present invention relates to a molded motor that includes a stator made by molding with a thermosetting resin. The stator includes: a stator core formed by stacking magnetic steel plates; an insulation portion applied to the stator core; a winding applied to the insulation portion; and a power supply terminal to which a power supply line for supplying power to the winding is connected. On an insulation inner wall provided on an inner diameter side of the insulation portion, a plurality of inner wall protrusions, formed at axial ends of the insulation inner wall on a counter wire-connection side of the stator core and abutting on a die being used when the stator is molded, are provided in a circumferential direction of the stator core.

According to the present invention, inner-wall protrusions formed at the end of an insulation inner wall on a counter wire-connection side are supported by a die when molded; and an installation surface of the inner-wall protrusions is provided inside of a bracket fitting portion. Therefore, when a molded motor has been assembled, penetration of water into the molded stator is suppressed, thereby enabling further quality improvement to be achieved.

DETAILED DESCRIPTION

Exemplary embodiments of a molded motor and an air conditioner according to the present invention will be described below in detail with reference to the accompanying drawings. The present invention is not limited to the embodiments.

Embodiment

Figure 1:
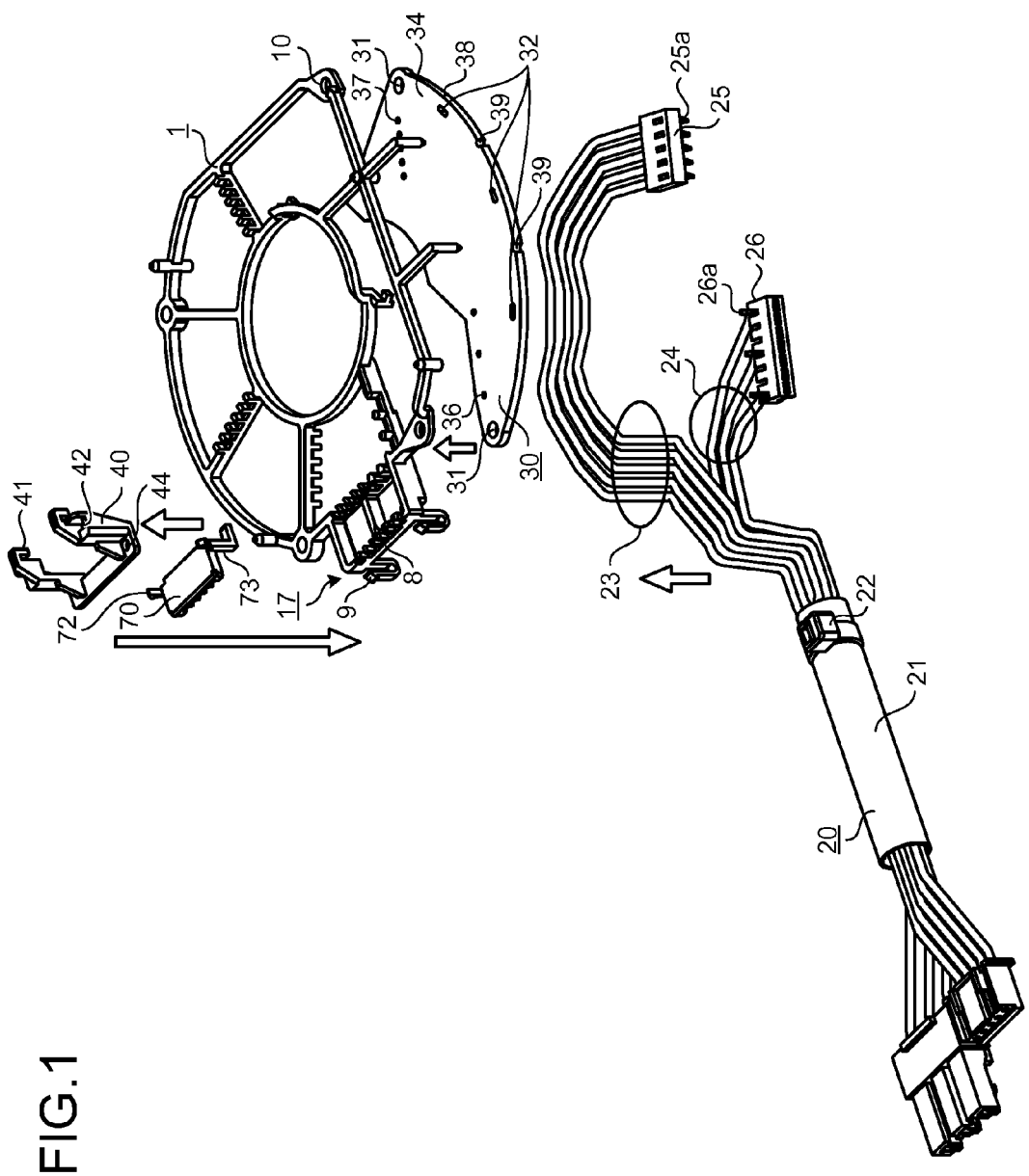
FIG. 1 is a perspective view illustrating a state before attaching a sensor board to a lead-wire wiring component of a molded motor according to an embodiment of the present invention.
Figure 2:
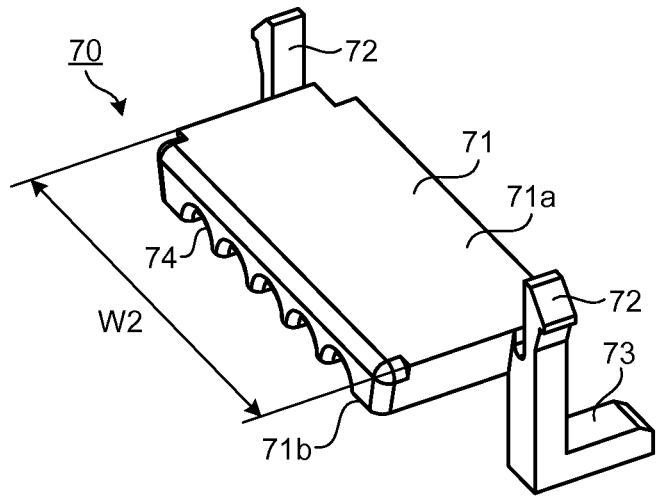
FIG. 2 is a perspective view of a lead-out component for pressing a sensor lead wire group.
Figure 3:
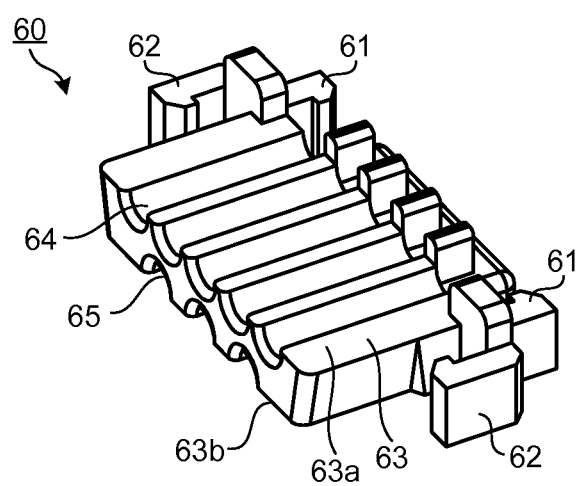
FIG. 3 is a perspective view of a lead-out component for a lead wire partition.
Figure 4:
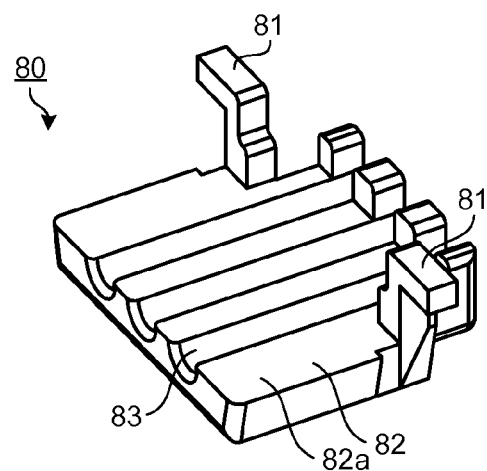
FIG. 4 is a perspective view of a lead-out component for pressing a power lead wire group.
Figure 5:
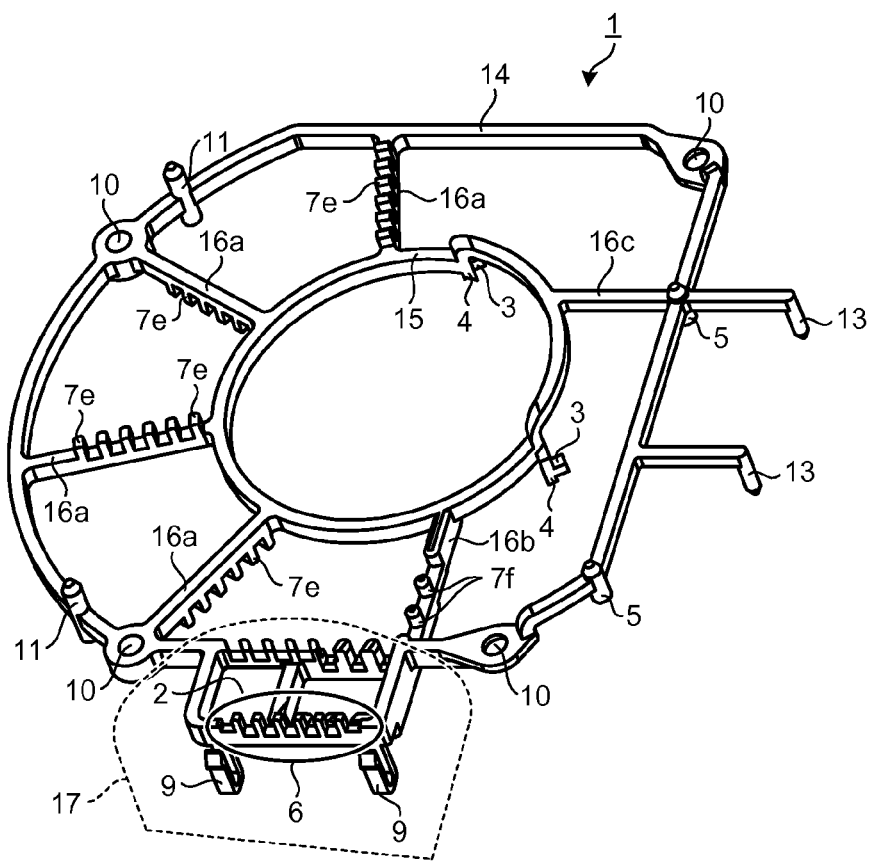
FIG. 5 is a detailed diagram of the lead-wire wiring component.
Figure 6:
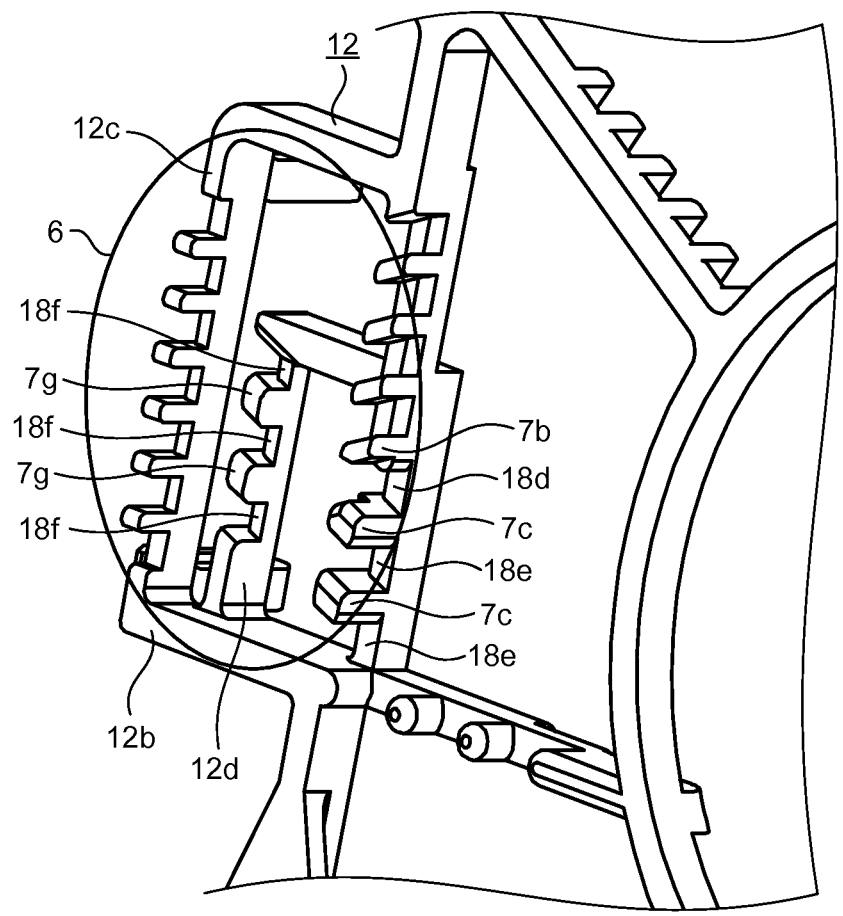
FIG. 6 is a detailed diagram of a fourth frame portion of a guide frame.
Figure 7:
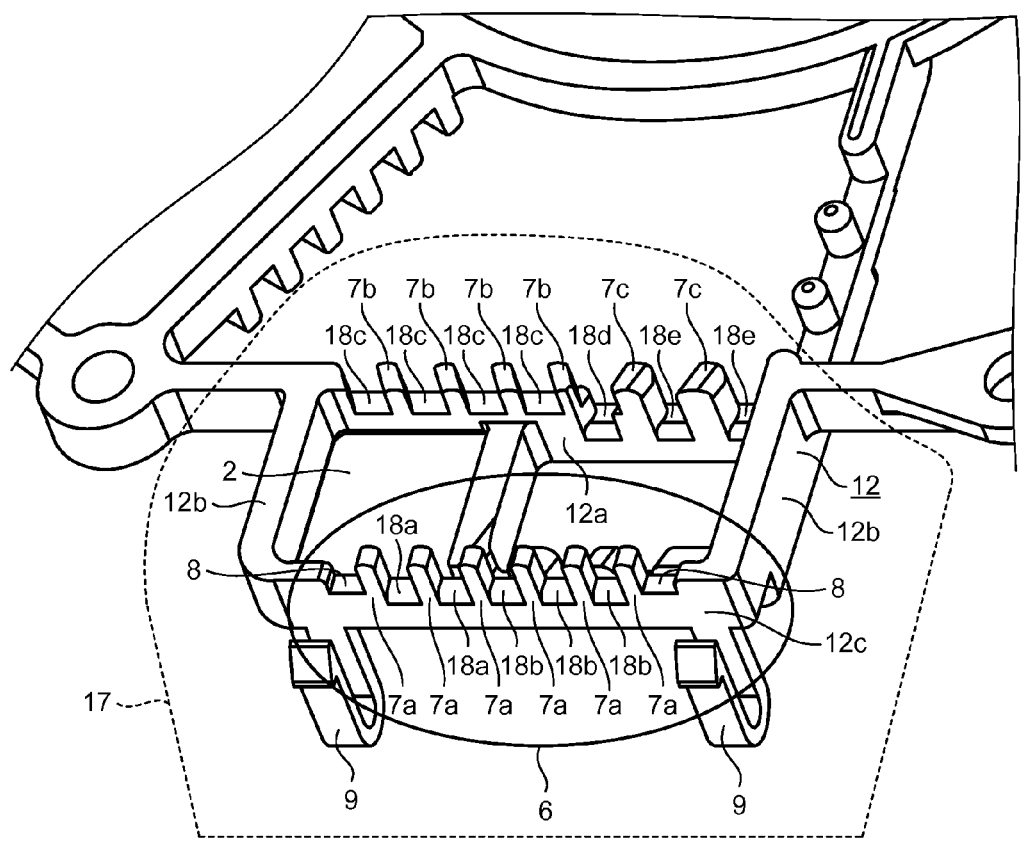
FIG. 7 is a detailed diagram of a lead-wire introducing and holding portion of the lead-wire wiring component.
Figure 8:
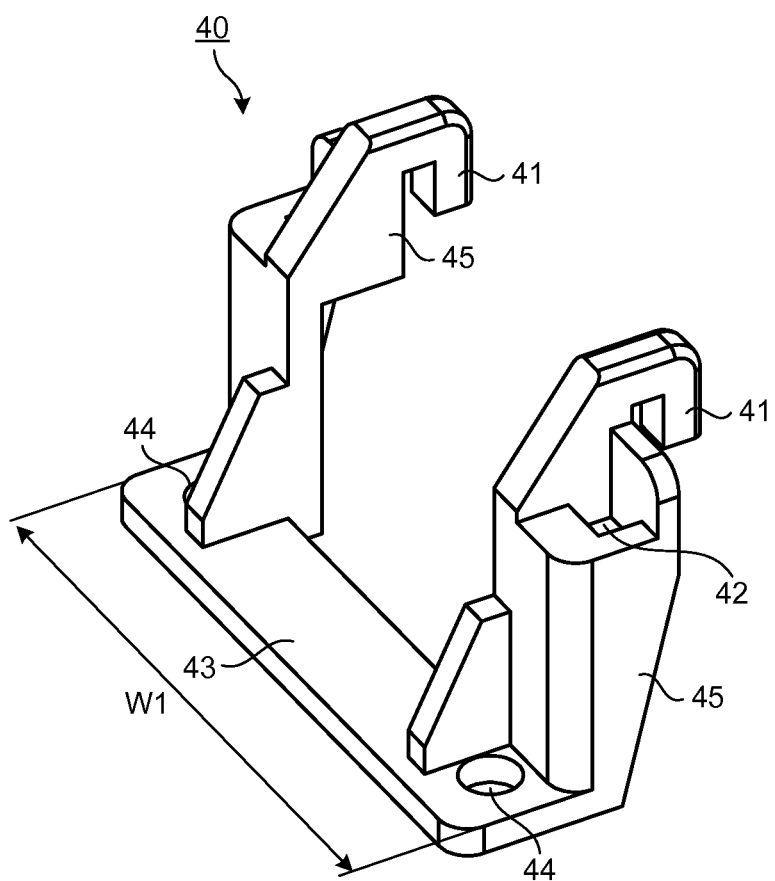
FIG. 8 is a detailed diagram of a temporary fixing component.
Figure 9:
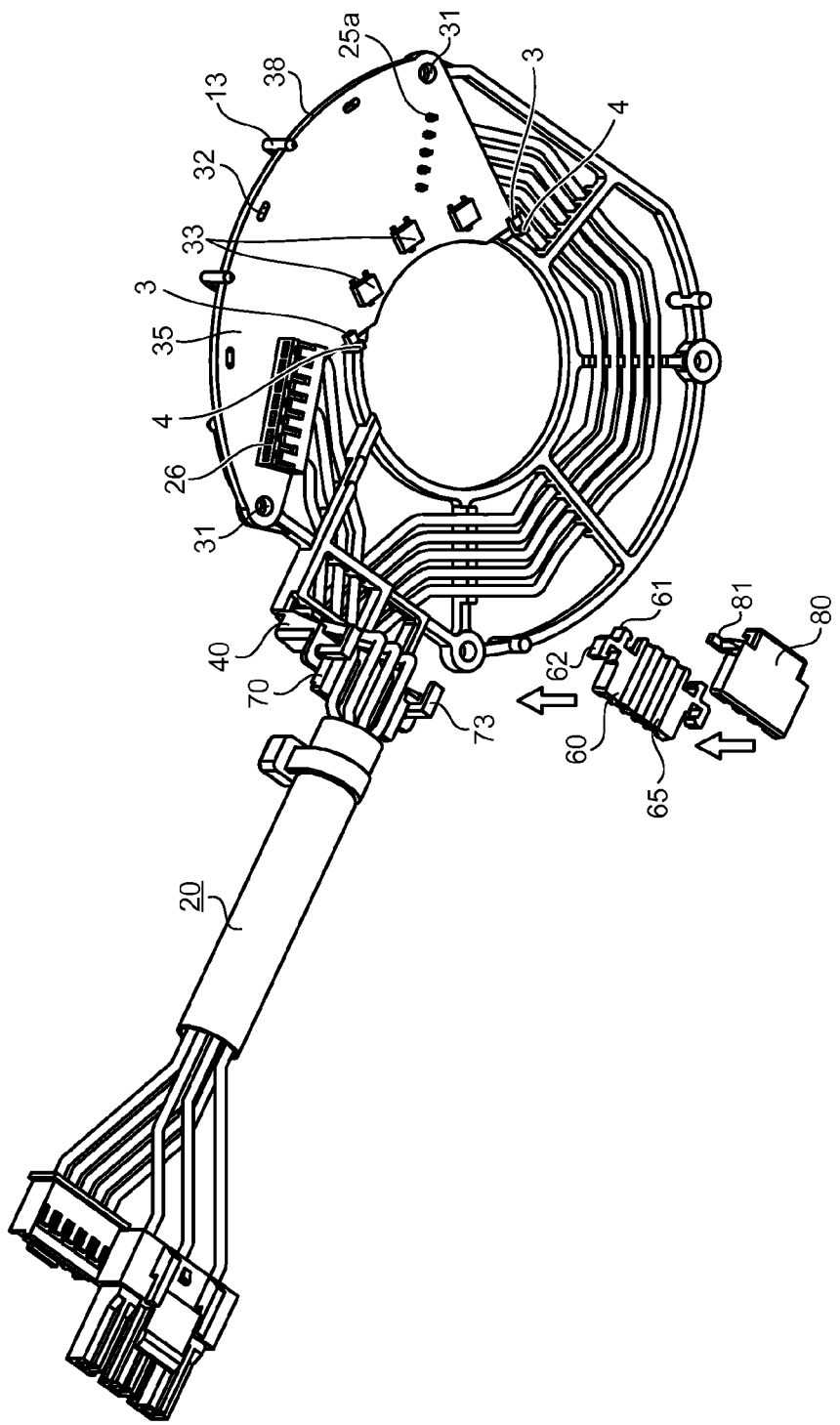
FIG. 9 is a diagram illustrating a state of attaching respective lead-out components to the temporary fixing component.
Figure 10:
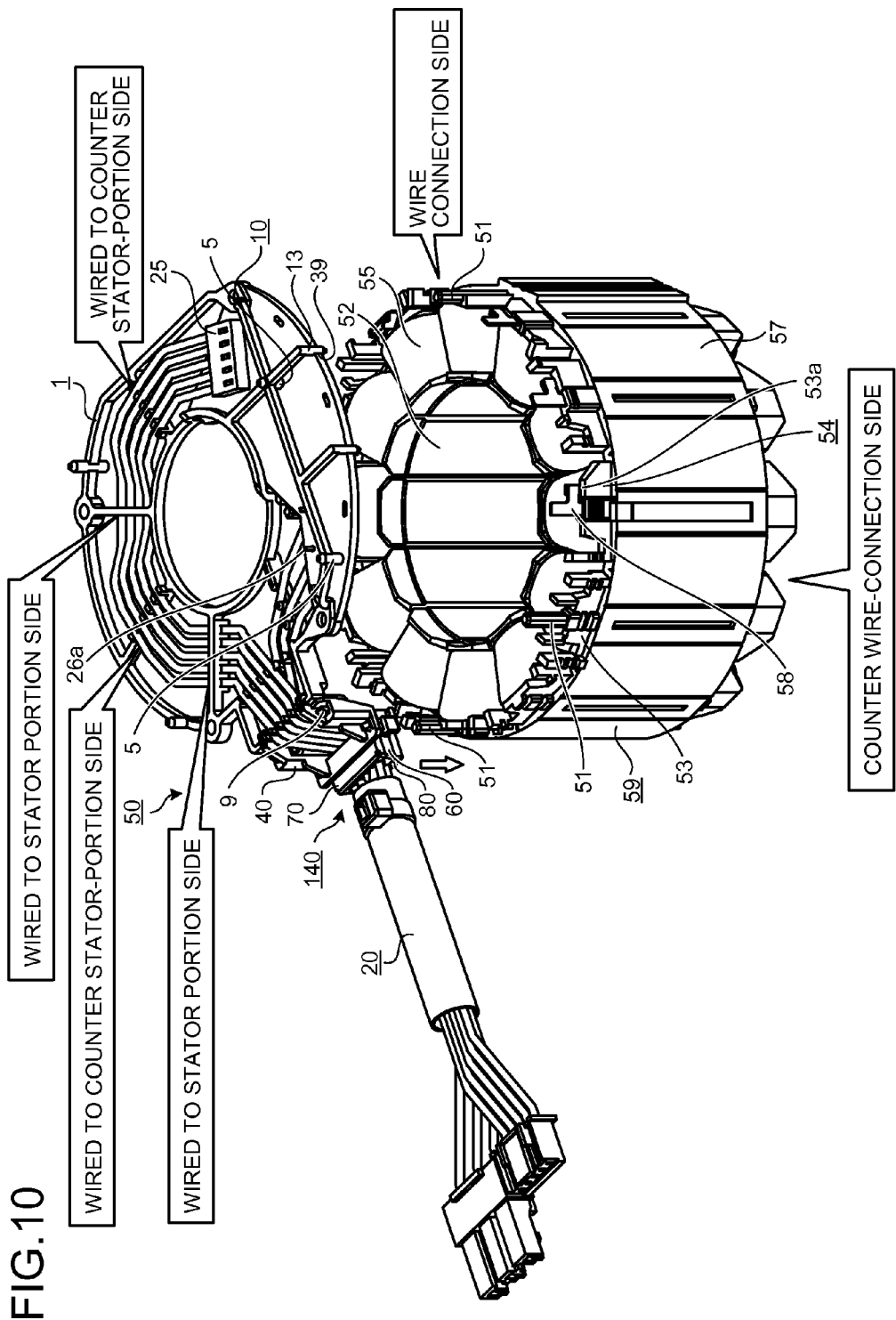
FIG. 10 is a perspective view before the lead-wire wiring component is attached to a stator.
Figure 11:
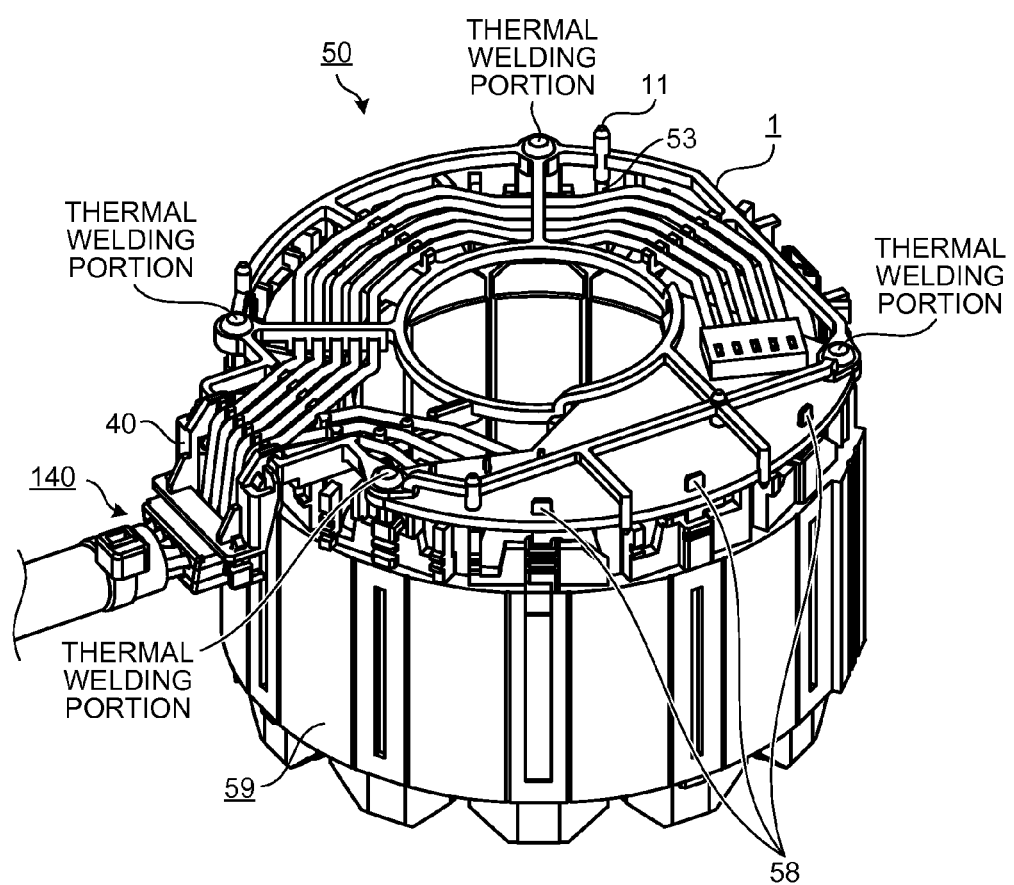
FIG. 11 is a perspective view after the lead-wire wiring component is attached to the stator.
Figure 12:
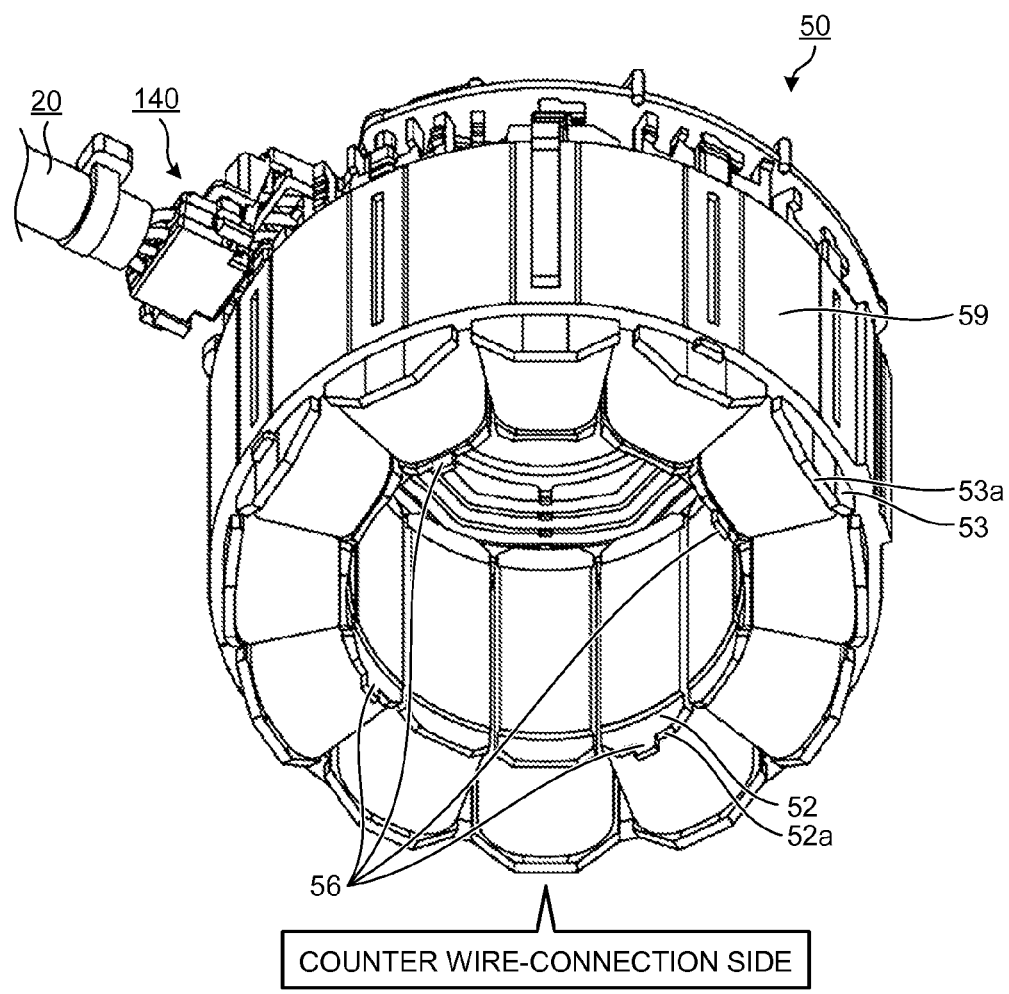
FIG. 12 illustrates a plurality of inner wall protrusions formed on an insulation inner wall of a stator core.
Figure 13:
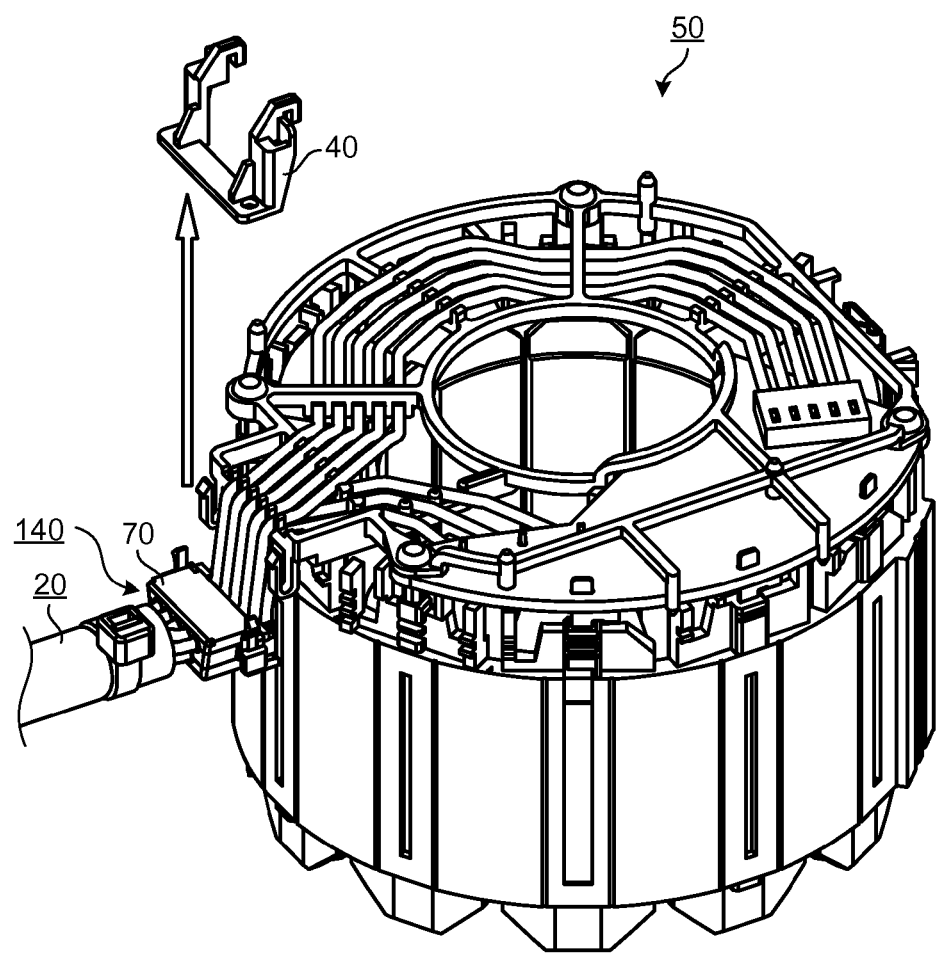
FIG. 13 illustrates a state of detaching the temporary fixing component.
Figure 14:
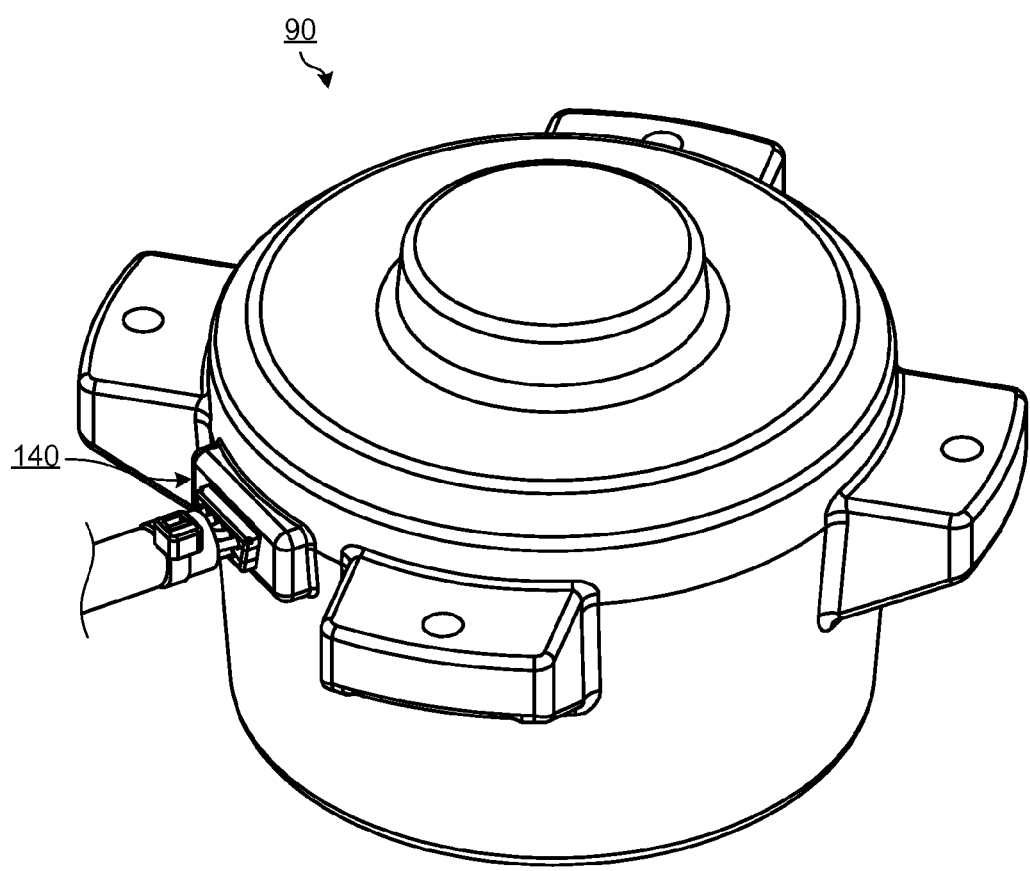
FIG. 14 is a perspective view of a molded stator as viewed from a side opposite to a load.
Figure 15:
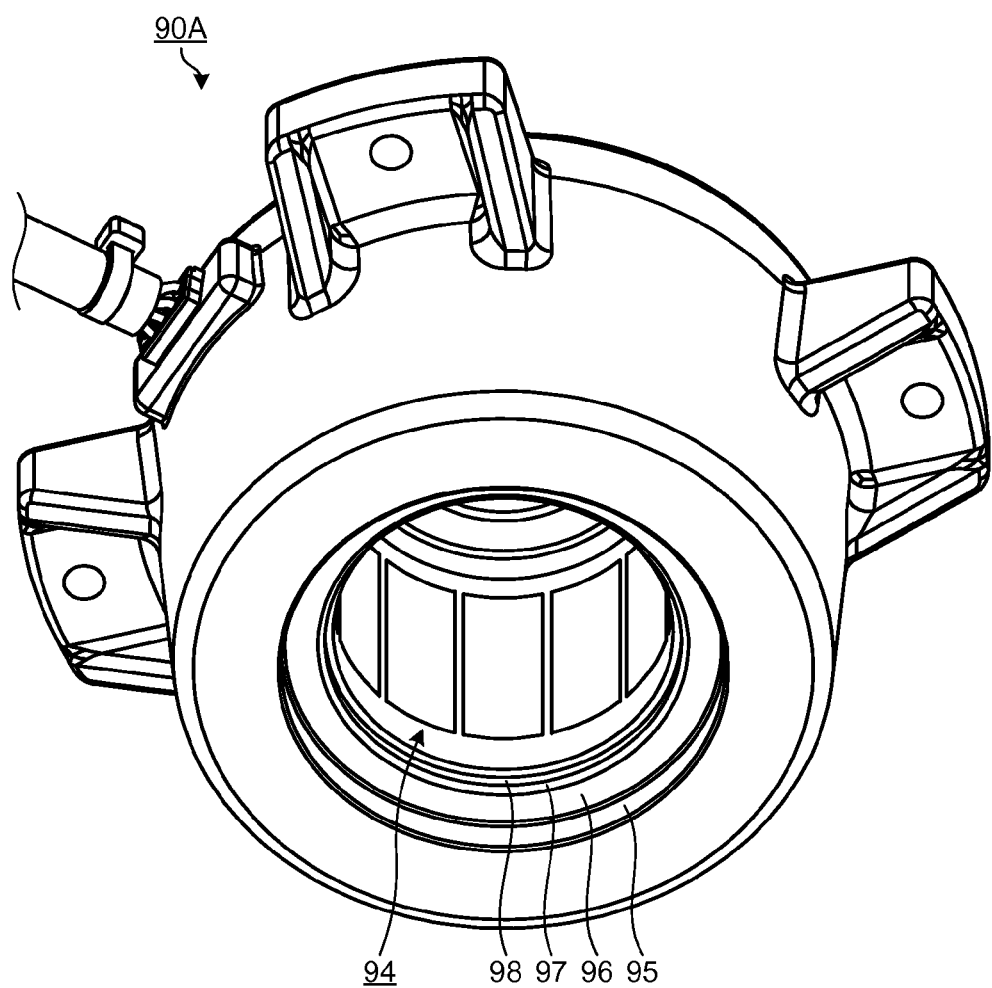
FIG. 15 is a perspective view illustrating a molded stator molded by a die core-bar portion having a stepped portion.
Figure 16:
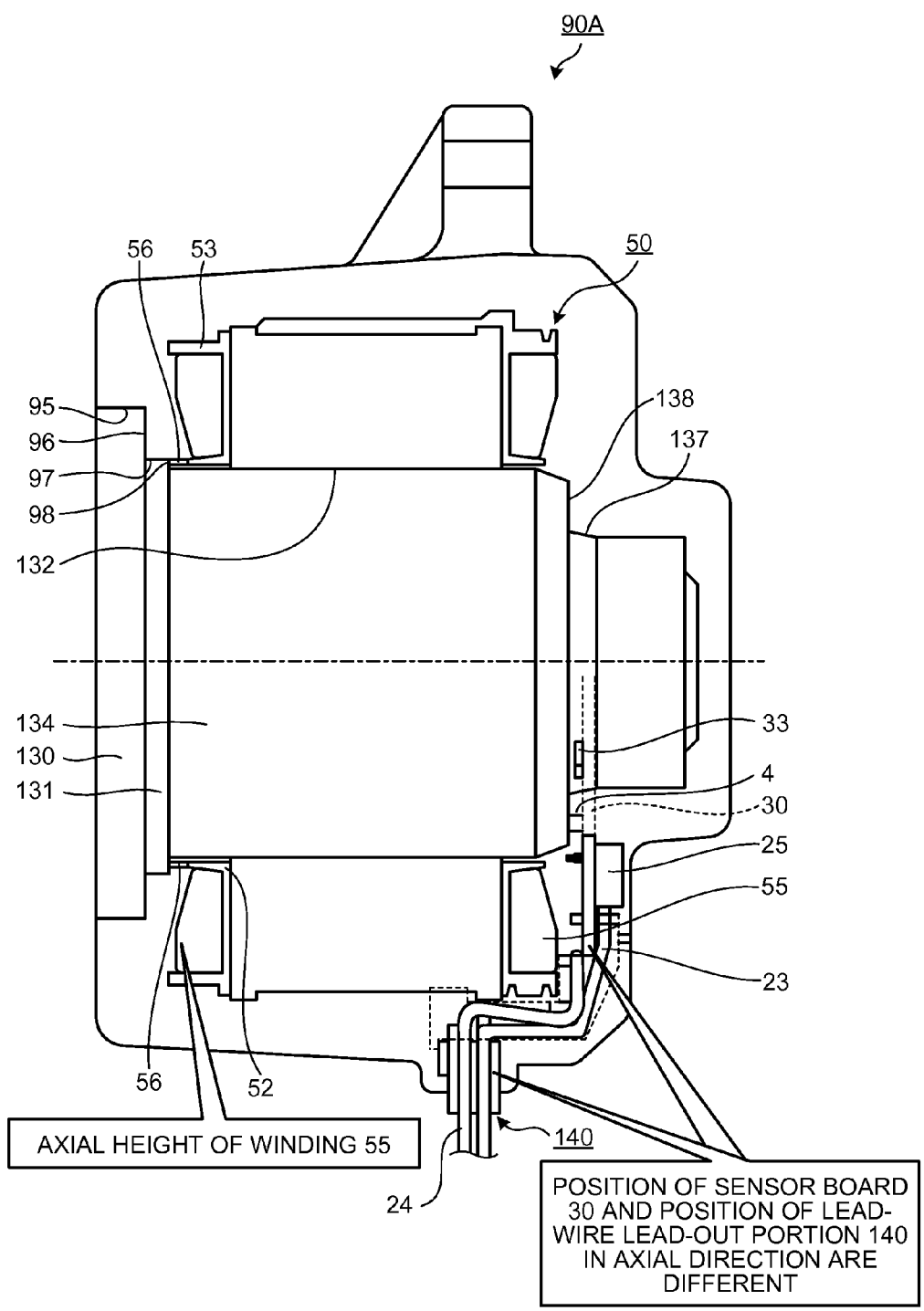
FIG. 16 is a sectional view illustrating the molded stator molded by the die core-bar portion having the stepped portion.
Figure 17:
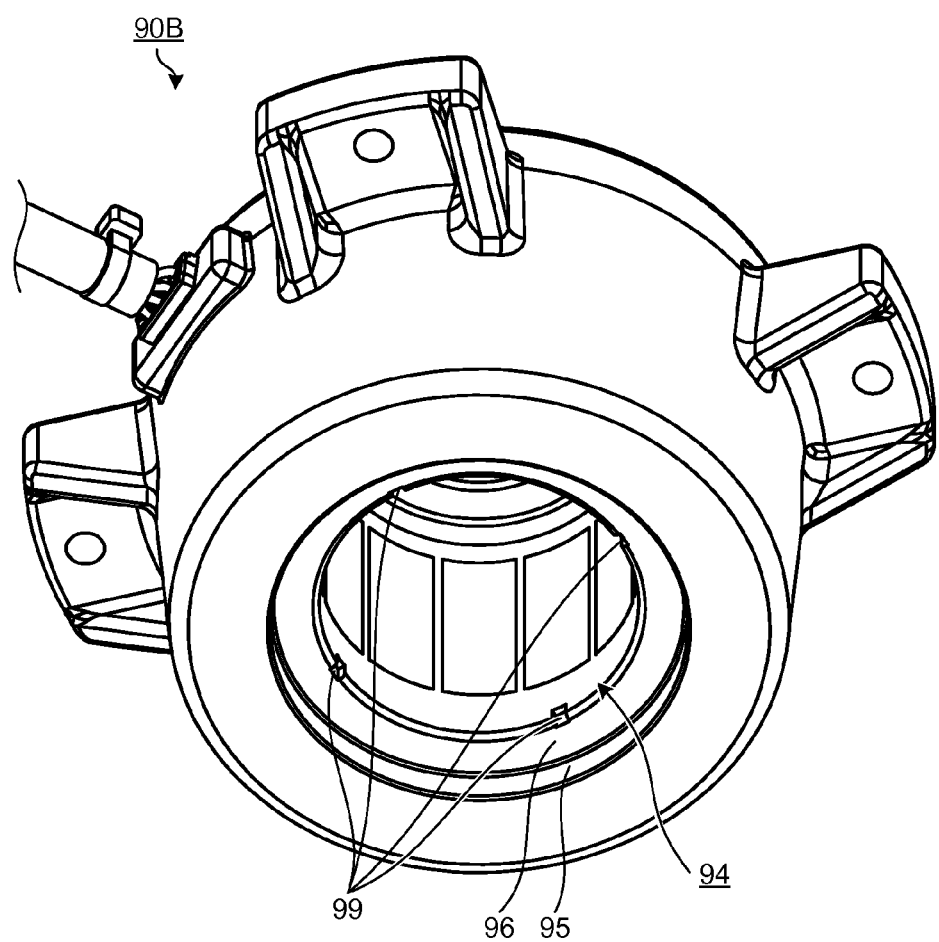
FIG. 17 is a perspective view illustrating a molded stator molded by a die core-bar portion having a claw.
Figure 18:
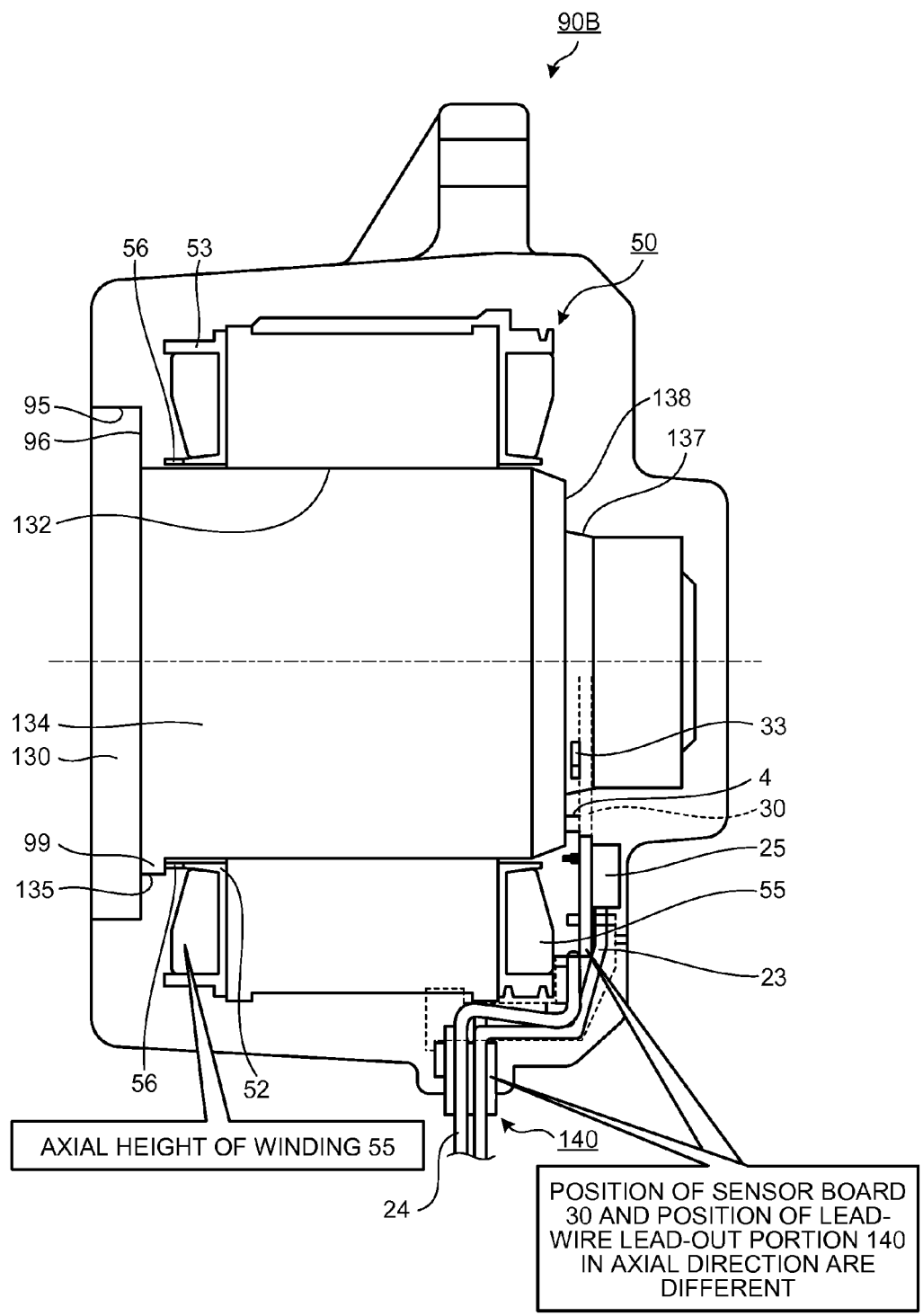
FIG. 18 is a sectional view illustrating the molded stator molded by the die core-bar portion having the claw.
Figure 19:
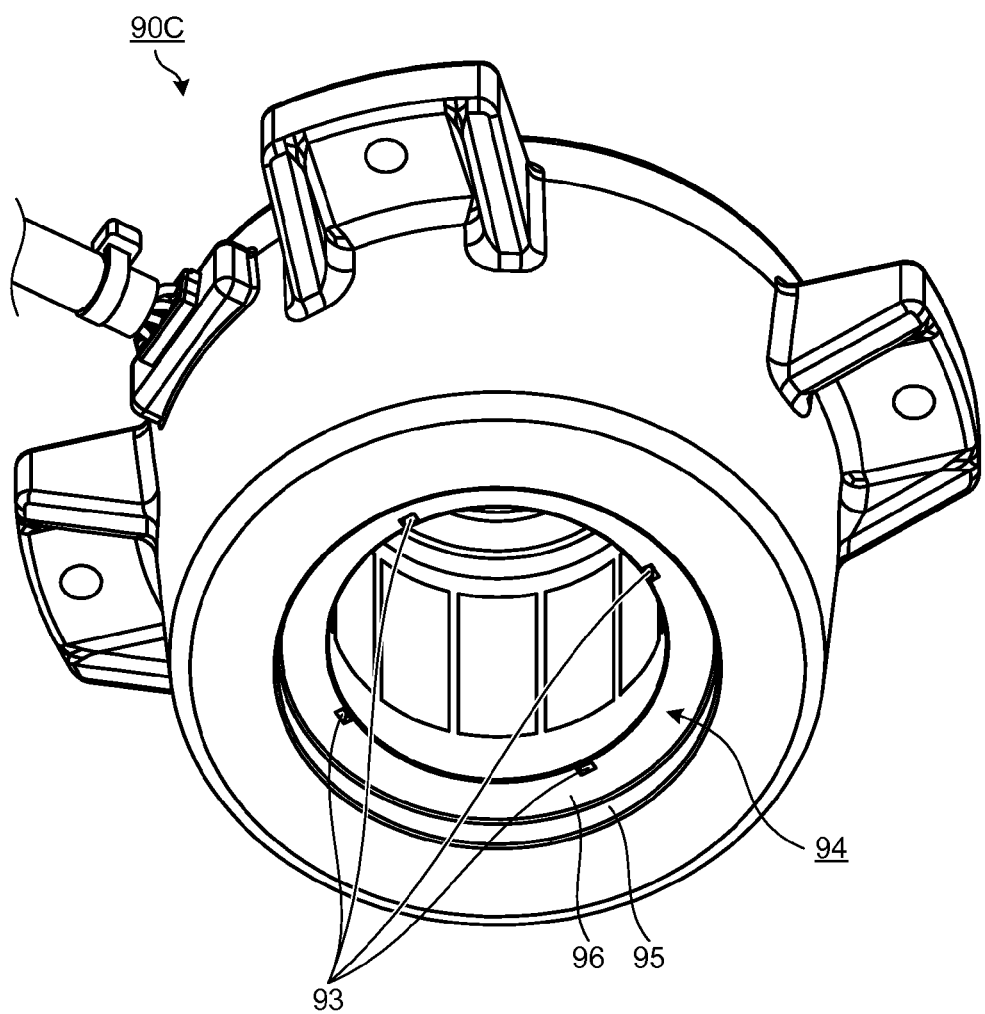
FIG. 19 is a perspective view illustrating a molded stator molded by a die core-bar portion having a protrusion.
Figure 20:
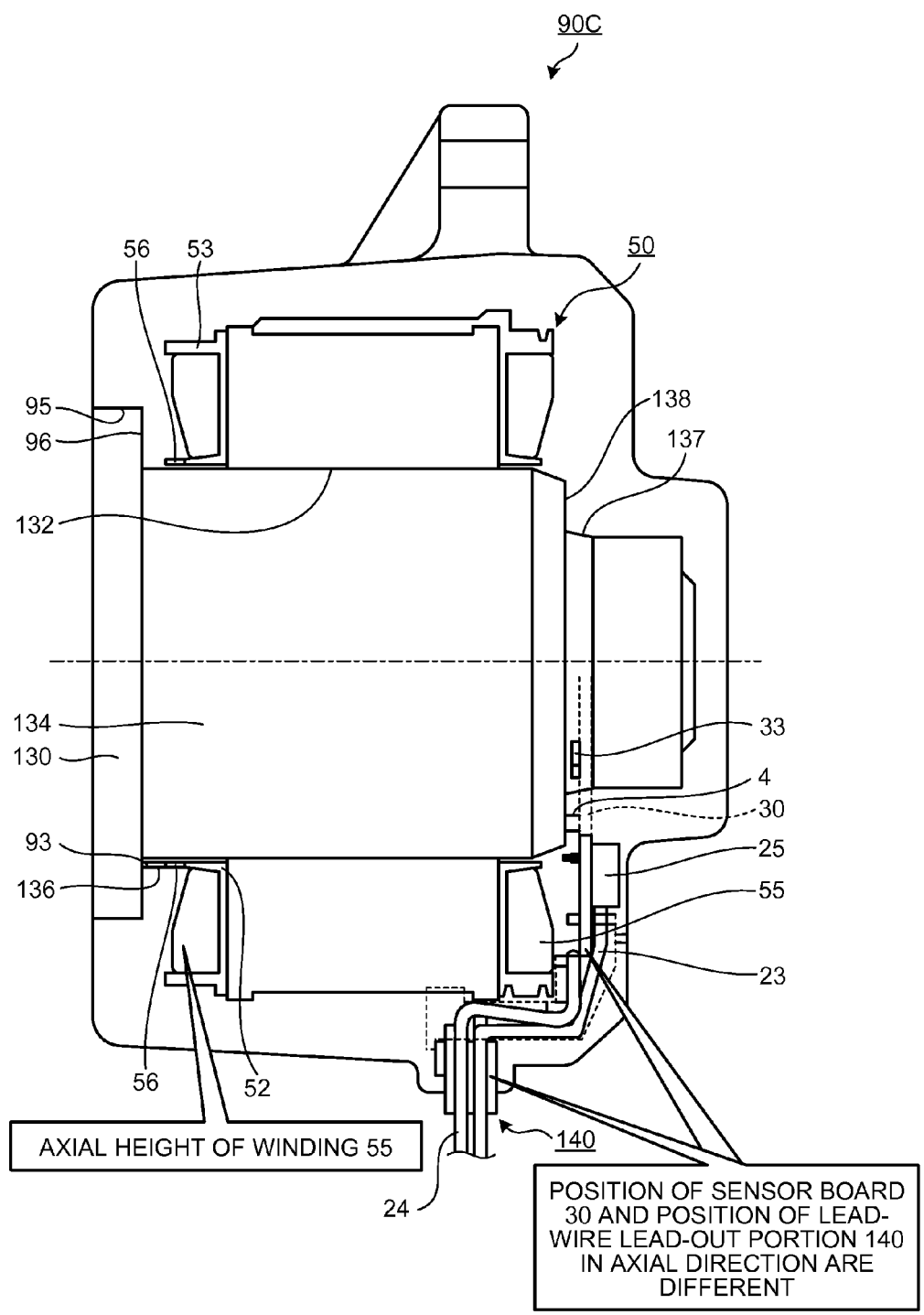
FIG. 20 is a sectional view illustrating the molded stator molded by the die core-bar portion having the protrusion.
Figure 21:
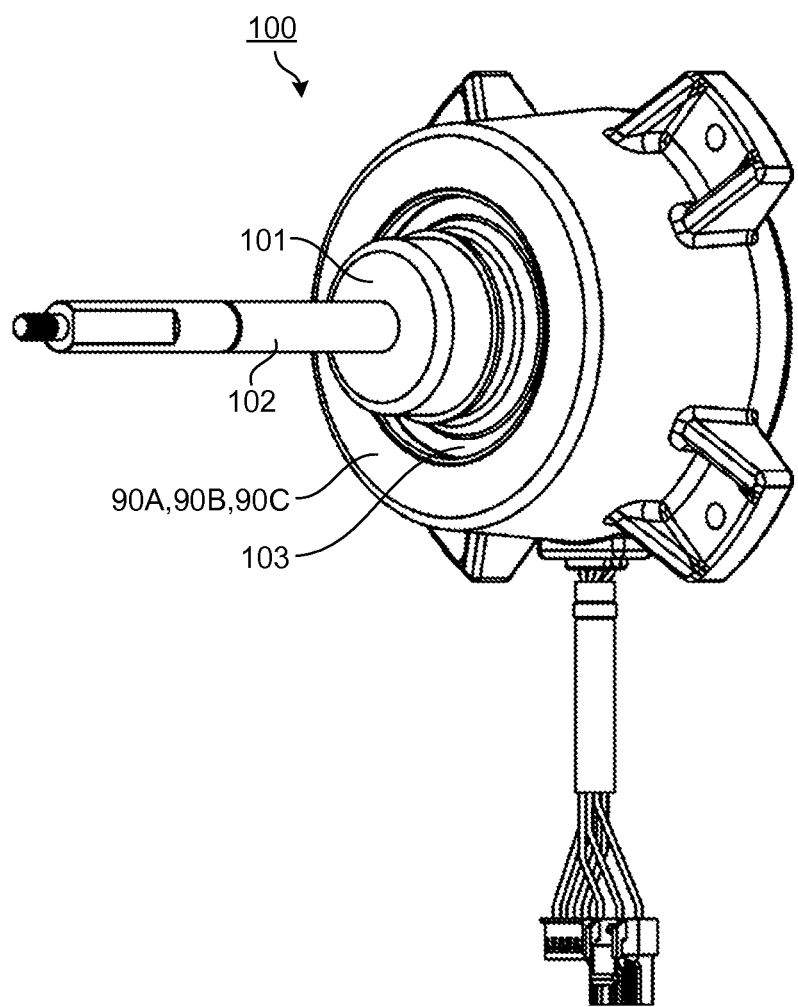
FIG. 21 is a perspective view of the molded motor having a rotor incorporated in the molded stator.
Figure 22:
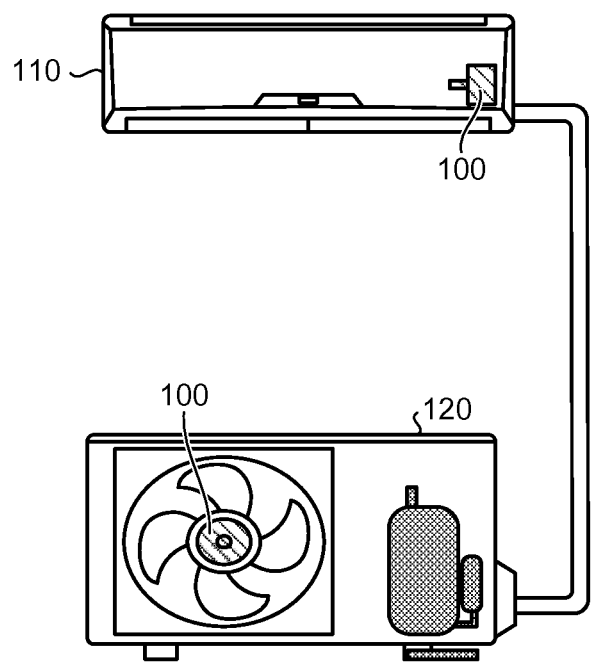
FIG. 22 is a configuration diagram of an air conditioner having the molded motor incorporated therein.

FIG. 1 is a perspective view illustrating a state before attaching a sensor board 30 to a lead-wire wiring component 1 of a molded motor 100 according to an embodiment of the present invention. FIG. 2 is a perspective view of a lead-out component 70 for pressing a sensor lead wire group 23. FIG. 3 is a perspective view of a lead-out component 60 for a lead wire partition. FIG. 4 is a perspective view of a lead-out component 80 for pressing a power lead wire group 24. FIG. 5 is a detailed diagram of the lead-wire wiring component 1. FIG. 6 is a detailed diagram of a fourth frame portion 12d of a guide frame 12. FIG. 7 is a detailed diagram of a lead-wire introducing and holding portion 17 of the lead-wire wiring component 1. FIG. 8 is a detailed diagram of a temporary fixing component 40. FIG. 9 is a diagram illustrating a state of attaching the respective lead-out components (60, 70, and 80) to the temporary fixing component 40. FIG. 10 is a perspective view before the lead-wire wiring component 1 is attached to a stator 50. FIG. 11 is a perspective view after the lead-wire wiring component 1 is attached to the stator 50. FIG. 12 illustrates a plurality of inner wall protrusions 56 formed on an insulation inner wall 52 of a stator core 57. FIG. 13 illustrates a state of detaching the temporary fixing component 40. FIG. 14 is a perspective view of a molded stator 90 as viewed from a side opposite to a load. FIG. 15 is a perspective view illustrating a molded stator 90A molded by a die core-bar portion having a stepped portion 131. FIG. 16 is a sectional view illustrating the molded stator 90A molded by the die core-bar portion having the stepped portion 131. FIG. 17 is a perspective view illustrating a molded stator 90B molded by a die core-bar portion having a claw 135. FIG. 18 is a sectional view illustrating the molded stator 90B molded by the die core-bar portion having the claw. FIG. 19 is a perspective view illustrating a molded stator 90C molded by a die core-bar portion having a protrusion 136. FIG. 20 is a sectional view illustrating the molded stator 90C molded by the die core-bar portion having the protrusion 136. FIG. 21 is a perspective view of the molded motor 100 having a rotor shaft 102 incorporated in the molded stator 90. FIG. 22 is a configuration diagram of an air conditioner having the molded motor 100 incorporated therein.

In FIG. 10, the stator 50 is configured to include a stator portion 59 and the lead-wire wiring component 1. The stator portion 59 is configured to include the stator core 57 formed by punching a magnetic steel plate in a belt-like shape and stacking the magnetic steel plates by swaging, welding, bonding, and the like in an axial direction of the rotor shaft 102 (see FIG. 21); an insulation portion 54 formed by integrally forming a thermoplastic resin such as PBT (polybutylene terephthalate) with the stator core 57, or after forming the stator core 57, assembling the integrally formed stator core 57 to the stator portion 59; and a winding 55 formed by winding a magnet wire around the insulation portion 54.

One terminal of the magnet wire of each phase is bonded by fusing or soldering to a power supply terminal 58, to which power from outside is supplied. The other terminal forms a neutral point with terminals of all phases that are brought together. The windings 55 of the same phase are connected by a connecting line. In the following descriptions, an outside of an axial end face of the stator core 57, that is, a side including the power supply terminal 58 is referred to as "wire connection side"; and an opposite side thereof is referred to as "counter wire-connection side".

An insulation outer wall 53 of the stator core 57 prevents the winding 55 from falling over toward an outer peripheral side of the stator core 57; and the insulation inner wall 52 of the stator core 57 prevents the winding 55 from falling over toward an inner peripheral side of the stator core 57.

On the wire connection side of the stator core 57, plural columnar shaped (for example, octagonal column shaped) attachment pins 51 for attaching the sensor board 30 and the lead-wire wiring component 1 to the stator portion 59 are provided at an axial end 53a of the insulation outer wall 53.

On the counter wire-connection side of the stator core 57 illustrated in FIG. 12, a plurality of inner wall protrusions 56 extending in an axial direction are provided at an axial end 52a of the insulation inner wall 52. The inner wall protrusions 56 are provided roughly at an equal interval in a circumferential direction of the stator core 57; and as an example, four inner wall protrusions 56 are provided in FIG. 12. These inner wall protrusions 56 abut on the die core-bar portion (the stepped portion 131, the claw 135, or the protrusion 136 described later), when molding the stator 50.

The inner wall protrusions 56 are preferably formed so that the axial end thereof becomes equal to or lower than a height of a tip of the axial end 53a of the insulation outer wall 53 of the stator core 57. To describe this configuration, the tip of the axial end 53a of the insulation outer wall 53 is formed so that the height thereof is slightly higher than an axial maximum height of the winding 55. The winding 55 is formed so that the axial height thereof (see FIG. 16) becomes lower as approaching the insulation inner wall 52 from the insulation outer wall 53. Therefore, when the stator 50 is provided in the die core-bar portion in a state where the counter wire-connection side of the stator core 57 is directed downward, the winding 55 does not come into contact with the die core-bar portion and the stator core 57 can be stably placed. This is because of the configuration in which the height of the inner wall protrusion 56 can ensure a sufficient distance from the axial end of the inner wall protrusion 56 to the winding 55 and is equal to or lower than the height of the insulation outer wall 53. As a result, improvements are achieved in both productivity and quality.

FIG. 1 illustrates the lead-wire wiring component 1, a lead-wire wiring assembly 20, the temporary fixing component 40, the lead-out component 70, and the sensor board 30.

The lead-wire wiring assembly 20 is configured to include the power lead wire group 24 that supplies power to the winding 55, the sensor lead wire group 23, a board-in connector 26 connected to a terminal of the power lead wire group 24, and a board-in connector 25 connected to a terminal of the sensor lead wire group 23. A terminal 26a is provided in the board-in connector 26; and a terminal 25a is provided in the board-in connector 25. According to the present embodiment, as an example, the length of the sensor lead wire group 23 from a lead-wire lead-out portion 140 to the board-in connector 25 is set to be longer than the length of the power lead wire group 24 from the lead-wire lead-out portion 140 to the board-in connector 26.

In the sensor board 30, a counter-stator side surface 34, on which a power supply pattern is formed and a stator side surface 35, on which electronic components such as a sensor circuit 33 are mounted (see FIG. 9) on the sensor board 30, function independently. Therefore, according to the present embodiment, these board surfaces do not need to be joined electrically; and a non-through board can be used as the sensor board 30, thereby enabling the cost to be low.

In FIG. 9, the board-in connector 26 is provided on the stator side surface of the sensor board 30; and the terminal 26a provided in the board-in connector 26 protrudes to the counter-stator side surface 34 of the sensor board 30 through a terminal insertion hole 36 (see FIG. 1) formed in the sensor board 30 (see FIG. 10). Because the terminal insertion hole 36 and a power-supply terminal hole 32 are connected by a power-supply wiring pattern provided on the sensor board 30, the power lead wire group 24 and the winding 55 are electrically joined by soldering these terminals.

In FIG. 10, the board-in connector 25 is provided on the counter-stator side surface 34 of the sensor board 30; and the terminal 25a provided in the board-in connector 25 protrudes to the stator side surface 35 of the sensor board 30 via a terminal insertion hole 37 (see FIG. 1) formed in the sensor board 30 (see FIG. 9). Because the terminal insertion hole 36 and the power-supply terminal hole 32 are connected by a wiring pattern provided on the sensor board 30, the sensor lead wire group 23 and the electronic components such as the sensor circuit 33 are electrically joined by soldering these terminals.

The lead-wire wiring component 1 illustrated in FIG. 5 is configured to mainly include a first frame 14, a second frame 15, and a plurality of joining portions 16.

The first frame 14 is formed in a substantially circular thin shape and is provided on an extended line, which extends in the axial direction, of the insulation outer wall 53 on the wire connection side of the stator core 57. A plurality of insertion holes 10, a plurality of movement suppressing pins 11, a plurality of board pressing protrusions 5, and a plurality of outer-periphery pressing portions 13 are formed on the first frame 14; and the lead-wire introducing and holding portion 17 is also formed. Note that the number of the insertion holes 10, the movement suppressing pins 11, the board pressing protrusions 5, and the outer-periphery pressing portions 13 is not limited to the number illustrated in FIG. 5.

The attachment pin 51 on the wire connection side is inserted into the insertion hole 10; and as illustrated in FIG. 11, when the lead-wire wiring component 1 is attached to the stator portion 59, the attachment pin 51 is welded in the insertion hole 10.

The movement suppressing pins 11 are provided in a projecting manner in the axial direction from the first frame 14 so as to come into contact with the axial end of the insulation outer wall 53 (see FIG. 11) in order to reduce displacement of the stator 50 toward the wire connection side when molding the stator 50.

The board pressing protrusions 5 are provided in a projecting manner in the axial direction from the first frame 14 so as to come into contact with the counter-stator side surface 34 of the sensor board 30 (see FIG. 10) in order to reduce displacement of the sensor board 30 toward the wire connection side when molding the stator 50.

A tip portion of the outer-periphery pressing portion 13 is bent toward the side of the stator portion 59 at a predetermined position, after the outer-periphery pressing portion 13 extends radially outward from the first frame 14 so as to come into contact with an outer peripheral edge 38 of the sensor board 30 (see FIG. 1) in order to prevent the sensor board 30 from moving radially (particularly in the outer circumferential direction of the stator 50), when assembling the sensor board 30 to the lead-wire wiring component 1.

Two outer-periphery pressing portions 13 are provided in the lead-wire wiring component 1; and as illustrated in FIG. 1, the sensor board 30 is desirably provided with a notch 39, to which the outer-periphery pressing portion 13 is fitted, on the outer peripheral edge 38 thereof. According to the configuration, the outer-periphery pressing portion 13 enters into a depressed portion of the notch 39 (see FIG. 10); and thus a circumferential displacement of the sensor board 30 is also reduced. As a result, a work for assembling the lead-wire wiring component 1 attached with the sensor board 30 to the stator portion 59 is facilitated, thereby achieving productivity improvement and cost reduction; and quality improvement is achieved along with the productivity improvement.

In FIG. 5 and FIG. 7, the lead-wire introducing and holding portion 17 is configured to include the guide frame 12, a plurality of locking portions 9, a plurality of wiring protrusions (7a to 7c), a plurality of wiring grooves (18a to 18e), and two temporary fixing-component installation grooves 8.

In the present embodiment, the position of the sensor board 30 and the position of the lead-wire lead-out portion 140 in the axial direction differ (see FIG. 16). For example, as illustrated in FIG. 11, the lead wire groups (23 and 24) are fixed to the lead-wire lead-out portion 140 provided near the outer periphery of the stator portion 59 by the temporary fixing component 40. These lead wire groups (23 and 24) need to be wired from the lead-wire lead-out portion 140 toward the wire connection side of the stator core 57 along the outer periphery of the stator core 57, and guided to the sensor board 30 when they have reached near the lead-wire wiring component 1.

The guide frame 12 illustrated in FIG. 7 is for bending the lead wire groups (23 and 24) provided from the lead-wire lead-out portion 140 to the lead-wire wiring component 1 along the outer periphery of the stator core 57 toward the center of the stator portion 59 and guiding the lead wire groups (23 and 24) to the sensor board 30. The guide frame 12 is configured to include a first frame portion 12a, second frame portions 12b, and a third frame portion 12c, and an opening 2 is formed in a central part thereof.

The first frame portion 12a is provided in a part of the first frame 14. The first frame portion 12a is provided with a plurality of wiring protrusions 7b and 7c formed in a projecting manner toward an opposite side of the stator portion 59 (a counter-stator portion side).

A wiring groove is formed between these protrusions, and of these grooves, for example, in four wiring grooves 18c on the left side in FIG. 7, each of four lead wires of five lead wires constituting the sensor lead wire group 23 is respectively held. In the fifth wiring groove 18d from the left in FIG. 7 (a groove provided between the wiring protrusion 7b and the wiring protrusion 7c), one of the five lead wires constituting the sensor lead wire group 23 and one of three lead wires constituting the power lead wire group 24 are overlapped vertically and are held (see FIG. 10). Further, each of two lead wires of the three lead wires constituting the power lead wire group 24 is respectively held in two wiring grooves 18e on the right side in FIG. 7.

The second frame portions 12b extend from the first frame 14 radially outward; and the third frame portion 12c is provided at the ends thereof.

The third frame portion 12c is provided so as to connect the ends of two second frame portions 12b, and for example, is provided radially more outside than an axially extended line of the outer periphery of the stator core 57. The third frame portion 12c is provided with a plurality of wiring protrusions 7a formed in a projecting manner toward the counter-stator portion side. A slightly smaller fourth frame portion 12d is also provided inside of the third frame portion 12c. The fourth frame portion 12d is provided with a plurality of wiring protrusions 7g formed in a projecting manner toward the counter-stator portion side; and is provided with a plurality of wiring grooves 18f. The third frame portion 12c and the fourth frame portion 12d constitute a bent wiring portion 6. The third frame portion 12c bends and guides the sensor lead wire group 23, wired in the axial direction from the lead-wire lead-out portion 140 to the inside of the lead-wire wiring component 1. The fourth frame portion 12d bends and guides the power lead wire group 24, wired in the axial direction from the lead-wire lead-out portion 140 to the inside of the lead-wire wiring component 1. In the bent wiring portion 6, for example, the sensor lead wire group 23 is wired on this side of FIG. 7; and the power lead wire group 24 is wired between the third frame portion 12c and the fourth frame portion 12d. Because the fourth frame portion 12d is provided on the center side of the stator than the third frame portion 12c, the distance from the center of the lead-wire wiring component 1 to the power lead wire group 24 becomes shorter than the distance from the center of the lead-wire wiring component 1 to the sensor lead wire group 23. Further, because the fourth frame portion 12d is provided nearer to the end face on the wire connection side of the stator core 57 than the third frame portion 12c, the distance from the sensor lead wire group 23 bent toward the lead-wire wiring component 1 by the third frame portion 12c to the end face on the wire connection side of the stator core 57 (or an outer periphery of the winding 55) becomes longer than the distance from the power lead wire group 24 bent toward the lead-wire wiring component 1 by the fourth frame portion 12d to the end face on the wire connection side of the stator core 57. In this manner, in the bent wiring portion 6, the sensor lead wire group 23 and the power lead wire group 24 are wired so that the distance from the lead-wire wiring component 1 and the distance from the end face on the wire connection side of the stator core 57 respectively differ.

Among the grooves formed between these protrusions, for example, the first groove from the left side in FIG. 7 and the first groove from the right side in FIG. 7 are the temporary fixing-component installation grooves 8 for installing the temporary fixing component 40 (see FIG. 8).

The locking portions 9 are provided in the third frame portion 12c with a predetermined distance therebetween and formed in a hooked shape, with the tip thereof being formed in a hook-like shape for locking the temporary fixing component 40.

The second frame 15 illustrated in FIG. 5 is formed in a substantially circular thin shape, which is smaller than an inner diameter of the first frame 14 and larger than an outer diameter of a bearing insertion-surface forming portion 137 (see FIG. 16) of the die core-bar portion, and is provided so as to face a die core-bar-portion end face 138 inside of the first frame 14. The second frame 15 is formed with a plurality of molding-die core-bar portion installation legs 4 formed in a projecting manner toward the stator portion 59; and the molding-die core-bar portion installation leg 4 is formed with a plurality of board holding portions 3 formed in a projecting manner radially outward.

The molding-die core-bar portion installation legs 4 extend axially on a surface of the second frame 15 on the side of the stator core 57, so that each tip portion thereof comes into contact with the die core-bar portion (the die core-bar-portion end face 138 illustrated in FIGS. 16, 17, and 19), in order to prevent the sensor board 30 from being displaced due to a pressure when molding the stator 50.

The board holding portion 3 is provided in a projecting manner radially outward of the molding-die core-bar portion installation legs 4 so as to engage with the stator side surface 35 of the sensor board 30 and hold the sensor board 30 (see FIG. 9) in order to prevent radial and axial displacement of the sensor board 30 when molding the stator 50.

A plurality of joining portions 16a, 16b, and 16c radially extending from the second frame 15 toward the first frame 14 are provided between the first frame 14 and the second frame 15. The first frame 14 and the second frame 15 are integrally formed by these joining portions 16a, 16b, and 16c.

A plurality of wiring protrusions 7e formed in a projecting manner toward the counter-stator portion side and a plurality of wiring protrusions 7e formed in a projecting manner toward the stator portion side are alternately provided in each of the joining portions 16a. With these wiring protrusions 7e, the respective lead wires constituting the sensor lead wire group 23 are held so as to be disposed with a predetermined distance therebetween.

If there is no joining portions 16a, the respective lead wires may be fixed in a state where respective lead wires come into contact with each other when molding the stator 50. In this case, a void may be formed at a portion where the respective lead wires come into contact with each other. In this case, for example, water penetrating from a boundary surface between the lead-wire lead-out portion 140 (see FIG. 10) and the mold resin may seep into the voids between the respective lead wires and reach the sensor board 30.

According to the present embodiment, because the respective lead wires constituting the sensor lead wire group 23 are held by the joining portions 16a, the respective lead wires do not come into contact with each other when molding the stator 50; and the generation of void can be reduced. Accordingly, the water penetrating from the boundary surface between the lead-wire lead-out portion 140 and the mold resin does not seep into the voids between the lead wires to reach the sensor board 30; and improvement in quality can be achieved as a result.

A plurality of wiring protrusions 7f formed in a projecting manner toward the counter-stator portion side are similarly provided in the joining portion 16b. Therefore, water penetrating from the lead-wire lead-out portion 140 into the molded stator 90 does not seep into through the voids between the respective lead wires constituting the power lead wire group 24 and does not reach the sensor board 30; and thus improvement in quality can be achieved as a result.

Attachment of the sensor board 30 to the lead-wire wiring component 1 as configured as described above is performed in such a manner that the sensor board 30 is assembled to the lead-wire wiring component 1, while aligning, on the same axial line, an insertion hole 31 of the sensor board 30 and the insertion hole 10 of the lead-wire wiring component 1. FIG. 9 is a diagram illustrating a state where the sensor board 30 is assembled to the lead-wire wiring component 1. When the sensor board 30 is assembled to the lead-wire wiring component 1, the board holding portion 3 engages with the sensor board 30; and the outer peripheral edge 38 of the sensor board 30 is held by the outer-periphery pressing portion 13.

First, the sensor lead wire group 23 is wired to the lead-wire wiring component 1 to which the sensor board 30 has been assembled; and the sensor lead wire group 23 wired to the third frame portion 12c is then wired to the wiring grooves 18c and 18d of the first frame portion 12a, and then pulled round in an arc-like shape in a clockwise direction as viewed from the counter-stator portion side of the lead-wire wiring component 1. The board-in connector 25 is then assembled to the sensor board 30.

The power lead wire group 24 is then wired to the fourth frame portion 12d; and the power lead wire group 24 wired to the fourth frame portion 12d is wired to the wiring grooves 18d and 18e of the first frame portion 12a and pulled round in an arc-like shape in a counterclockwise direction as viewed from the counter-stator portion side of the lead-wire wiring component 1. The board-in connector 26 is then assembled to the sensor board 30.

The sensor lead wire group 23 between from the first frame portion 12a to the sensor board 30 is wired alternately, as illustrated in FIG. 10, to the counter-stator portion side and to the stator portion side. By wiring in this manner, the sensor lead wire group 23 can be fastened to a predetermined position in the axial direction; and the contact between the sensor lead wire group 23 and the winding 55 can be prevented when molding the stator 50. Further, it can be prevented that the sensor lead wire group 23 protrudes toward the outer periphery side of the molded stator 90, thereby enabling improvement in the quality.

Taking into consideration that the sensor lead wire group 23 is pulled round in the clockwise direction, the four wiring protrusions 7b illustrated in FIG. 7 are formed so that surfaces coming into contact with the respective lead wires of the sensor lead wire group 23 are inclined toward a guide direction of the sensor lead wire group 23 (in FIG. 7, the left side of the first frame portion 12a). This configuration facilitates the wiring of the sensor lead wire group 23 so as to improve manufacturing productivity, thereby enabling the improvements in quality and costs to be further reduced.

Similarly, taking into consideration that the power lead wire group 24 is pulled round in the counterclockwise direction, the two wiring protrusions 7c are formed so that the surfaces coming into contact with the respective lead wires of the power lead wire group 24 are inclined toward a guide direction of the power lead wire group 24 (in FIG. 7, the right side of the first frame portion 12a). This configuration facilitates the wiring of the power lead wire group 24 so as to improve productivity, thereby enabling the improvements in the cost reduction and quality.

In this manner, by using the lead-wire introducing and holding portion 17, the sensor lead wire group 23 and the power lead wire group 24 are branched respectively in the different directions so as to prevent overlapping of the respective lead wires included in the branched lead wire groups (23 and 24), thereby enabling reductions in wiring length of the respective lead wires to the absolute minimum length. Further, because a space can be ensured between the adjacent lead wires, the lead wires do not overlap each other and the voids disappear after having been molded, and the penetration of water into the sensor board 30 can be prevented, thereby enabling an improvement in quality.

The temporary fixing component 40 illustrated in FIG. 8 is configured to include an installation surface 43 formed in a substantially rectangular plate-like shape, on which the lead-out component 70 is provided; locking holes 44 formed in the installation surface 43; joining portions 45 provided at opposite ends of the installation surface 43 and extending in the axial direction; installation legs 41 provided at the ends of the joining portions 45 and locked by the temporary fixing-component installation grooves 8 (see FIG. 7); and locking holes 42 respectively formed in the joining portions 45 in the axial direction.

A longitudinal width W1 of the installation surface 43 is formed to be longer than a longitudinal width W2 of the lead-out component 70 illustrated in FIG. 2. An engaging portion 72 provided in the lead-out component 70 is inserted into the locking hole 44. An end of the locking portion 9 (see FIG. 5) provided in the lead-wire introducing and holding portion 17 is inserted into the locking hole 42.

The lead-out component 70 illustrated in FIG. 2 includes a stator-mold upper-die pressing surface 71 formed in a substantially rectangular plate-like shape; and a fitting portion 73 provided on short-side end faces of the stator-mold upper-die pressing surface 71.

A plurality of grooves 74 for holding the sensor lead wire group 23 are formed on a lead-wire-side end face 71b of the stator-mold upper-die pressing surface 71. The installation surface 43 of the temporary fixing component 40 in FIG. 8 comes into contact with a counter-lead wire-side end face 71a of the stator-mold upper-die pressing surface 71.

The fitting portion 73 is formed in an L-shape; and an engaging portion 62 of the lead-out component 60 illustrated in FIG. 3 is attached to the fitting portion 73. At one end of the fitting portion 73, the engaging portion 72 that is inserted into the locking hole 44 formed in the installation surface 43 of the temporary fixing component 40 so as to engage with the installation surface 43 is formed.

The lead-out component 60 illustrated in FIG. 3 includes a lead-wire fixing portion 63 in a substantially rectangular plate-like shape; the engaging portion 62 locked to the fitting portion 73 of the lead-out component 70; and the engaging portion 61 locked to a fitting portion 81 of the lead-out component 80.

A plurality of grooves 64 for holding the sensor lead wire group 23 are formed on a sensor lead-wire-side end face 63a of the lead-out component 60. A plurality of grooves 65 for holding the power lead wire group 24 are formed on a power lead-wire-side end face 63b of the lead-out component 60.

The lead-out component 80 illustrated in FIG. 4 includes a power lead-wire fixing portion 82 in a substantially rectangular plate-like shape; and the fitting portion 81 locked to an engaging portion 61 of the lead-out component 60. A plurality of grooves 83 for holding the power lead wire group 24 are formed on a power lead-wire-side end face 82a of the power lead-wire fixing portion 82.

In the molded motor 100 according to the present embodiment, water is prevented from seeping on the boundary surface between the lead-wire lead-out portion 140 and the mold resin and from penetrating into the molded stator 90; and at the same time the lead-wire lead-out portion 140 is prevented to come into contact with the lead-wire wiring component 1. Accordingly, the lead-wire lead-out portion 140 is assembled to the lead-wire wiring component 1 via the temporary fixing component 40 such that the lead wires from the bent wiring portion 6 of the lead-wire wiring component 1 to the lead-wire lead-out portion 140 do not sag and do not become short.

As specifically described, in FIG. 1, when the locking portions 9 of the lead-wire introducing and holding portion 17 are inserted into the locking holes 42 of the temporary fixing component 40, the installation legs 41 of the temporary fixing component 40 are fitted into the temporary-fixing-component installation grooves 8 of the lead-wire introducing and holding portion 17. Accordingly, the temporary fixing component 40 is temporarily fixed to the lead-wire introducing and holding portion 17. The engaging portions 72 of the lead-out component 70 are then inserted into the locking holes 44 of the temporary fixing component 40. Accordingly, the lead-out component 70 is assembled to the lead-wire wiring component 1 via the temporary fixing component 40; and the lead-out component 70 is provided at a position away from the lead-wire wiring component 1 by a predetermined distance.

Next, the sensor lead wire group 23 is placed in the grooves 74 of the lead-out component 70, while having an appropriate tension applied so that the respective lead wires of the sensor lead wire group 23 do not come into contact with each other. The sensor lead wire group 23 wired in this manner is illustrated in FIG. 9. Subsequently, the lead-out component 60 is fitted into an L-shaped fitting portion 73 of the lead-out component 70, while sliding the lead-out component 60 from the center of the lead-wire wiring component 1 toward outside. The lead-out component 60 is, thus, assembled to the lead-out component 70.

Because the sliding direction of the lead-out component 60 is a direction from the center of the lead-wire wiring component 1 toward outside, when assembling the lead-out component 60 to the lead-out component 70, the sensor lead wire group 23 is pulled in the sliding direction of the lead-out component 60. Therefore, the sensor lead wire group 23 is further pulled so as to correct the respective distortions of the lead wires of the sensor lead wire group 23. Accordingly, the respective lead wires do not come into contact with each other when molding the stator 50; and the voids between the respective lead wires described above can be reduced. As a result, water penetrating into the molded stator 90 from the side of the lead-wire lead-out portion 140 does not seep into the voids between the respective lead wires constituting the sensor lead wire group 23 so as to reach the sensor board 30, thereby enabling improvement in the quality.

Similarly, the power lead wire group 24 is placed in the grooves 65 of the lead-out component 60, while being applied with an appropriate tension so that the respective lead wires of the power lead wire group 24 do not come into contact with each other. Subsequently, the fitting portion 81 of the lead-out component 80 is fitted into the engaging portion 61 of the lead-out component 60, while sliding the fitting portion 81 from the center of the lead-wire wiring component 1 toward outside. Accordingly, the fitting portion 81 is locked to the engaging portion 61; and the lead-out component 80 is assembled to the lead-out component 60.

Because the sliding direction of the lead-out component 80 is from the center of the lead-wire wiring component 1 toward outside, when assembling the lead-out component 80 to the lead-out component 60, the power lead wire group 24 is pulled in the sliding direction of the lead-out component 80. Therefore, the power lead wire group 24 is further pulled so as to correct the respective distortions of the lead wires of the power lead wire group 24. As a result, water penetrating into the molded stator 90 from the side of the lead-wire lead-out portion 140 does not seep into the voids between the respective lead wires constituting the power lead wire group 24 so as to reach the sensor board 30, which is the effect as when assembling the lead-out component 60 to the lead-out component 70. This, thereby, enables the improvement in quality.

According to the procedures described above, the lead-wire wiring assembly 20 is assembled to the lead-wire wiring component 1. In the lead-wire wiring assembly 20 according to the present embodiment, a tube 21 that protects the respective lead wires is fixed by a unifying band 22. However, when the unifying band 22 is applied can be set after the stator 50 has been molded.

The lead-wire wiring component 1, in which the sensor board 30 and the lead-wire wiring assembly 20 are assembled, is assembled to the wire connection side of the stator core 57 by inserting the attachment pins 51 (see FIG. 10) provided on the stator core 57 into the insertion holes 10 of the lead-wire wiring component 1 and the insertion holes 31 of the sensor board 30. As illustrated in FIG. 11, the lead-wire wiring component 1 is fixed by welding the attachment pins 51 protruding on the counter stator side of the lead-wire wiring component 1. Temporary assembly of the stator 50 is thus complete.

Because the attachment pin 51 has substantially a regular octagonal columnar shape, corner portions of the attachment pin 51 comes into contact with the circular insertion holes 10 and 31. Accordingly, even if the attachment pin 51 and the insertion holes 10 and 31 are fitted to each other more tightly, because a contact portion is small when compared to a case where a circular pin is used, the resistance when inserting the attachment pin 51 can be reduced. As a result, the sensor board 30 can be accurately assembled to the stator portion 59, enabling the improvement in quality.

Thereafter, the stator 50 is provided in the die as illustrated in FIGS. 16, 17, and 19. When installing the stator 50 in the die, after the temporary fixing component 40 is detached from the lead-wire lead-out portion 140 (see FIG. 13) by unlocking the locking portion 9 from the lead-wire introducing and holding portion 17 or cutting the locking portion 9, molding is performed so as to obtain the molded stator 90 (see FIG. 14). The lead-wire wiring component 1 is configured to ensure a predetermined amount of space between the sensor board 30 and the lead-wire wiring component 1 (that is, between the first frame 14 and the counter-stator side surface 34; and between the second frame 15 and the counter-stator side surface 34). Therefore, when molding the stator 50, because the stator side surface 35 and the counter-stator side surface 34 of the sensor board 30 are covered with mold resin, the contacts can be reduced between the lead-wire wiring component 1 being a resin molded product and the sensor board 30. Accordingly, water seeping on and penetrating from the boundary surface between the lead-wire wiring component 1 and the mold resin does not reach the sensor board 30, thereby enabling the improvement in proof strength against deterioration of the circuit portion of the sensor board 30 and in quality.

When molding the stator 50, the lead-wire lead-out portion 140 is pushed out from the center of the stator 50 to outside by the molding pressure. Therefore, the position of the lead-wire lead-out portion 140 fixed by the temporary fixing component 40 is maintained without contacting the stator core 57. Accordingly, a clearance between the respective lead wires when the lead-wire lead-out portion 140 is fixed by the temporary fixing component 40 does not become narrow; and the water seeping on the boundary surface between the lead-wire lead-out portion 140 and the mold resin and penetrating into the molded stator 90 can be reduced, thereby enabling to improve the quality. Further, because the detached temporary fixing component 40 can be reused again, cost can be reduced.

FIG. 16 illustrates the die core-bar portion (a core bar portion of a lower molding die) having the stepped portion 131 for supporting the inner wall protrusions 56 when molding the stator 50. The core bar portion of the lower molding die includes a stator-core inner-diameter fitting portion 134 formed substantially in the same diameter as the inner diameter of the stator 50 and provided on the inner diameter side of the stator 50; a bracket fitting portion 130 having a larger diameter than the stator-core inner-diameter fitting portion 134; and the stepped portion 131 having a diameter smaller than the bracket fitting portion 130 and larger than the stator-core inner-diameter fitting portion 134, which forms an inner-wall protrusion installation surface 98 on which the inner wall protrusions 56 are located.

FIG. 15 illustrates a bracket fitting surface 95, a bracket installation surface 96, an inner periphery 97 of the stepped portion 131, and the inner-wall protrusion installation surface 98 of an opening 94 of the molded stator 90A formed by the die core-bar portion illustrated in FIG. 16. That is, in the opening 94 of the molded stator 90A, the bracket installation surface 96 and the inner-wall protrusion installation surface 98 positioned closer on the stator core side than the bracket installation surface 96 and having a diameter smaller than the bracket fitting surface 95 and larger than the inner diameter of the stator core are formed. The inner wall protrusions 56 are located on an axial end surface of the inner-wall protrusion installation surface 98 as illustrated in FIG. 16.

In conventional techniques, a regulating member provided in a die is provided on an outer periphery of a stator. Therefore, when molding the stator, a boundary surface is formed between a stator core (or an insulation portion of a stator core) supported by the regulating member and a mold resin; and the boundary surface becomes a penetration path for water into the molded stator, which may cause quality degradation.

In the molded stator 90A according to the present embodiment, as illustrated in FIG. 16, when the stator 50 is assembled to the die core-bar portion, the inner wall protrusions 56 provided on the insulation inner wall 52 are located on the surface of the inner-wall protrusion installation surface 98. That is, the outer periphery of the stator 50 does not need to be supported by a die (a conventional regulating member); and a boundary surface is not formed between the stator core and the mold resin on a shell of the molded stator 90A, in a state where a bracket 103 is assembled to the bracket fitting portion 130 of the stator when assembly of the molded motor. Accordingly, penetration of water into the molded stator 90A is reduced, thereby enabling the quality to be improved.

As a modification of the die core-bar portion, FIG. 18 illustrates a die core-bar portion having the protrusion 135 for supporting the inner wall protrusions 56. The die core-bar portion illustrated in FIG. 16 is different in that the claw 135 is provided instead of the stepped portion 131. The claw 135 is formed in the axial direction and closer on the stator side than the surface forming the bracket installation surface 96 and in a projecting manner by a predetermined amount on a radially outer peripheral side than a circumferential surface constituting an inner periphery 132 of the stator core, so that the inner wall protrusions 56 can be provided.

FIG. 17 illustrates the bracket fitting surface 95, the bracket installation surface 96, and concave portions 99 of the opening 94 of the molded stator 90B formed by the die core-bar portion illustrated in FIG. 18. The concave portion 99 is formed by the claw 135. That is, in the opening 94 of the molded stator 90B, there are formed the bracket installation surface 96, and the concave portions 99 formed extending from the bracket installation surface 96 toward the stator core side and extending radially outside from the inner periphery 132 of the stator core, the concave portions 99 being formed in plural in the circumferential direction. The inner wall protrusions 56 are located on bottom surfaces of the concave portions 99, the bottom being perpendicular to the axial direction, as illustrated in FIG. 18. With respect to the molded stator 90B, effects identical to those of the molded stator 90A can be acquired in a state where the bracket 103 is assembled to the bracket fitting portion 130 of the stator when assembling the molded motor.

As a modification of the die core-bar portion, a die core-bar portion having the protrusions 136 for supporting the inner wall protrusions 56 is illustrated in FIG. 20. A different point from the die core-bar portion illustrated in FIG. 16 is that the protrusion 136 is provided instead of the stepped portion 131. The protrusions 136 are formed in plural in the circumferential direction at a position away from a circumferential surface of the stator-core inner-diameter fitting portion 134 constituting the inner periphery 132 of the stator core, so that the inner wall protrusions 56 can be provided; and is formed in a projecting manner from the end face forming the bracket installation surface 96 in a direction toward the axial direction of the stator core side. The inner wall protrusions 56 are located on the projecting end face.

FIG. 19 illustrates the bracket fitting surface 95, the bracket installation surface 96, and holes 93 of the opening 94 of the molded stator 90C formed by the die core-bar portion illustrated in FIG. 20. The holes 93 are formed by the protrusion 136. That is, in the opening 94 of the molded stator 90C, there are formed the bracket installation surface 96, and the holes 93 positioned radially more outside than the inner periphery 132 of the stator core and extending from the bracket installation surface 96 toward the stator core side, the holes 93, a plurality thereof, being formed in the circumferential direction. The inner wall protrusions 56 are located on the bottom surfaces of the holes 93, the bottom being perpendicular to the axial direction, as illustrated in FIG. 20. The molded stator 90C, thus, has effects identical to those of the molded stator 90A in a case where the bracket 103 is assembled to the bracket fitting portion 130 of the stator when assembly the molded motor.

As illustrated in FIG. 21, by assembling the rotor shaft 102 and other components to the molded stator 90A, 90B, or 90C by the bracket 103, the molded motor 100 that can have excellent productivity and excellent quality and can reduce the cost. The bracket 103 illustrated in FIG. 21 is provided with a waterproof rubber 101 in order to prevent the water from penetrating between the rotor shaft 102 and the bracket 103.

FIG. 22 illustrates an air conditioner having the molded motor 100 according to the present embodiment incorporated therein. The air conditioner includes an indoor unit 110 and an outdoor unit 120 connected to the indoor unit 110. The indoor unit 110 and the outdoor unit 120 are provided with the molded motor 100 as a drive source for an air blower. By using an inexpensive and high quality molded motor 100 as a motor for the air blower being a main component of the air conditioner, the quality of the air conditioner can be improved.

According to the present embodiment, the sensor lead wire group 23 is pulled round in the clockwise direction on the lead-wire wiring component 1; and the power lead wire group 24 is pulled round in the counterclockwise direction on the lead-wire wiring component 1. However, the pulling directions of the respective lead wires can be reversed. Further, according to the present embodiment, the power lead wire group 24 is formed shorter than the sensor lead wire group 23; however, the sensor lead wire group 23 can be formed shorter than the power lead wire group 24. In this case, although voltage drop increases due to the resistance of the power lead wire group 24, the effects described above can be acquired.

As described above, the molded motor 100 according to the present embodiment is made by molding with a thermosetting resin, and includes the stator 50 that includes the stator core 57 formed by stacking magnetic steel plates; the insulation portion 54 applied to the stator core 57; the winding 55 applied to the insulation portion 54; and the power supply terminal 58 to which the power supply line (24) for supplying power to the winding 55 is connected. On the insulation inner wall 52 provided on the inner diameter side of the insulation portion 54, inner wall protrusions 56, a plurality thereof, which are provided in the circumferential direction of the stator core 57, are formed at axial ends 52*a* of the insulation inner wall 52 on the counter wire-connection side of the stator core 57, abutting on the die core-bar portion (the stepped portions 131, the claws 135, and the protrusions 136) used when the stator 50 is molded. According to the configuration, the outer periphery of the stator 50 does not need to be supported by the conventional regulating member; and a boundary surface is not formed between the stator core 57 and the mold resin. Accordingly, penetration of water into the molded stator 90 is reduced, thereby enabling the quality improvement.

The molded motor and the air conditioner according to the embodiment of the present invention are only an example of the contents of the present invention. The embodiment can be combined with other well-known techniques, and it is needless to mention that the present invention can be configured while modifying it without departing from the scope of the invention, such as omitting a part of its configuration.

INDUSTRIAL APPLICABILITY

As described above, the present invention is applicable to a molded motor and an air conditioner, and is particularly useful as an invention that can improve further in quality.

The invention claimed is:
1. A molded motor, comprising:
   a stator core that includes an opening of the stator core formed with
      a bracket installation surface, and
      an inner-wall protrusion installation surface positioned closer to a stator core side than the bracket installation surface and having a diameter smaller than a bracket-fitting inner periphery and larger than an inner diameter of the stator core; and
   an insulation portion applied to the stator core, wherein
   on an insulation inner wall provided on an inner diameter side of the insulation portion of the stator core, a plurality of inner wall protrusions, formed at axial ends of the insulation inner wall on a counter wire-connection side of the stator core and abutting on a die, are provided in a circumferential direction of the stator core, and
   each of the plurality of inner wall protrusions is located on an axial end face of the inner-wall protrusion installation surface.
2. The molded motor according to claim 1, wherein
   an axial end of each of the plurality of inner wall protrusions extends toward an opening of the stator core equal to or less than a tip portion of an axial end of an insulation outer wall of the stator core.
3. A molded motor, comprising:
   a stator core that includes an opening of the stator core formed with
      a bracket installation surface, and
      concave portions being formed in plural in a circumferential direction, extending from the bracket installation surface toward a stator core side, and extending from the inner periphery of the stator core to radially outside; and
   an insulation portion applied to the stator core, wherein
   on an insulation inner wall provided on an inner diameter side of the insulation portion of the stator core, a plurality of inner wall protrusions, formed at axial ends of the insulation inner wall on a counter wire-connection side of the stator core and abutting on a die, are provided in a circumferential direction of the stator core, and
   each of the plurality of inner wall protrusions are located on a bottom surface, the bottom surface being perpendicular to the axial direction, of each of the concave portions, respectively.
4. The molded motor according to claim 1, wherein
   an opening of the stator core is formed with
      a bracket installation surface, and
      holes
         formed in plural in the circumferential direction,
         positioned radially more outside of a diameter than an inner periphery of the stator core, and
         extending from the bracket installation surface toward the stator core side, and
   each of the plurality of inner wall protrusions are located on a bottom surface, the bottom surface being perpendicular to the axial direction, of each of holes, respectively.
5. An air conditioner comprising an air blower, wherein the molded motor according to claim 1 is incorporated in the air blower.
6. An air conditioner comprising an air blower, wherein the molded motor according to claim 3 is incorporated in the air blower.

* * * * *